(12) United States Patent
Tamura et al.

(10) Patent No.: US 8,885,964 B2
(45) Date of Patent: Nov. 11, 2014

(54) PROJECTOR, PROJECTION TRANSFORM PROCESSING DEVICE, AND IMAGE PROCESSING METHOD IN PROJECTOR

(75) Inventors: Akihiko Tamura, Matsumoto (JP); Takashi Shindo, Chino (JP); Makoto Eguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 407 days.

(21) Appl. No.: 13/039,652

(22) Filed: Mar. 3, 2011

(65) Prior Publication Data

US 2011/0216983 A1 Sep. 8, 2011

(30) Foreign Application Priority Data

Mar. 5, 2010 (JP) .................................. 2010-048643

(51) Int. Cl.
*G06K 9/40* (2006.01)

(52) U.S. Cl.
CPC ........................................ *G06K 9/40* (2013.01)
USPC ............................ 382/255; 345/156; 348/335

(58) Field of Classification Search
USPC ............................ 382/255; 345/156; 348/335
See application file for complete search history.

(56) References Cited

U.S. PATENT DOCUMENTS

| 5,721,957 | A | * | 2/1998 | Huang et al. | ................... | 710/66 |
| 5,787,889 | A | * | 8/1998 | Edwards et al. | ............. | 600/443 |
| 5,832,297 | A | * | 11/1998 | Ramagopal et al. | ............. | 710/5 |
| 6,590,579 | B1 | * | 7/2003 | Hong et al. | ................... | 345/552 |

FOREIGN PATENT DOCUMENTS

JP   A-2002-278507   9/2002
JP   A-2003-29714    1/2003

OTHER PUBLICATIONS

Toshiharu Murai, "Image processor and image display device", Sep. 27, 2002, JP2002-278507 machine translation.*

* cited by examiner

*Primary Examiner* — Chan Park
*Assistant Examiner* — Eueng-Nan Yeh
(74) *Attorney, Agent, or Firm* — Oliff PLC

(57) ABSTRACT

A projector includes: a frame image storage unit that stores input image data input to the projector; a block image storage unit that stores a part of the input image data in terms of block image data including N×M (where N and M≥2) pixels; a correction processing unit that performs a correction process of correcting a distortion of the image projected onto the projection plane to generate corrected image data which is image data after correction on the basis of the block image data stored in the block image storage unit; and a block image predicting unit that, while the correction processing unit performs the correction process on a predetermined pixel, predicts the block image data necessary for the correction process on a pixel to be processed after the predetermined pixel.

8 Claims, 16 Drawing Sheets

PROJECTOR, PROJECTION TRANSFORM PROCESSING DEVICE, AND IMAGE PROCESSING METHOD IN PROJECTOR

The entire disclosure of Japanese Patent Application No. 2010-048643, filed Mar. 5, 2010 is expressly incorporated by reference herein.

BACKGROUND

1. Technical Field

The present invention relates to a projector that displays an image on a projection plane.

2. Related Art

At the time of displaying a rectangular image (hereinafter, also referred to as an "original image") on a projection plane such as a screen using a projector, an image (hereinafter, also referred to as a "projection image") displayed on the projection plane may be distorted into a trapezoid, a parallelogram, and other tetragons due to the relative positional relationship between the projector and the projection plane. Such trapezoidal distortion and projection distortion are called "trapezoidal distortion" in this specification. When trapezoidal distortion is caused in a projection image in this way, a trapezoidal distortion correcting technique of correcting the projection image by projection transform so as to be displayed in a rectangular shape has been used.

JP-A-2002-278507 and JP-A-2003-29714 are examples of the related art.

In a projector that generates an image beam representing an image using a liquid crystal panel, an image (hereinafter, also referred to as "corrected image") which is obtained by inversely distorting a projection image on a projection plane is generated on the liquid crystal panel. Pixel values of the corrected image are obtained by interpolating the pixels on the basis of the pixel values of an original image. When it is intended to obtain the pixel value of one pixel in the corrected image, for example, the coordinate of the original image corresponding to the pixel in the corrected image is calculated and the pixel interpolation is performed using 16 pixels around the coordinate. That is, the trapezoidal distortion correcting process requires an increase in processing speed to process a large amount of calculation.

SUMMARY

An advantage of some aspects of the invention is to solve at least a part of the problems described above, and the invention can be implemented as the following forms or application examples.

According to an application example of the invention, there is provided a projector projecting and displaying an image on a projection plane, including: a frame image storage unit that stores input image data input to the projector; a block image storage unit that has a smaller capacity than that of the frame image storage unit and that stores a part of the input image data in terms of block image data including M×N (where M and N≥2) pixels; a correction processing unit that performs a correction process of correcting a distortion of the image projected onto the projection plane to generate corrected image data which is image data after correction on the basis of the block image data stored in the block image storage unit; and a block image predicting unit adapted to, while the correction processing unit performs the correction process on a predetermined pixel, predicts the block image data necessary for the correction on a pixel to be processed after the predetermined pixel, and, if the predicted block image data is not stored in the block image storage unit, reads the predicted block image data from the frame image storage unit and stores the predicted block image data in the block image storage unit.

According to this configuration, since the block image predicting unit is provided and thus a block image necessary for pixel interpolation is stored in advance in the block image storage unit, it is possible to shorten the time of reading and storing a necessary block image at the time of performing the pixel interpolation and to enhance the processing rate of the trapezoidal distortion correcting process.

According to one application example, tag information is used, and therefore it is possible to easily predict the block image data.

According to one application example, it is possible to simplify the retrieval of an x coordinate and to enhance the rate of predicting the block image data.

According to one application example, if the block image data is predicted but the block image data necessary for a pixel interpolation is not stored in the block image storage unit, it is possible to store the necessary block image data in the block image storage unit.

According to one application example, it is possible to easily perform the determination using the tag information.

The invention can be embodied in various forms. For example, the invention can be embodied in forms such as a projection transform processing device and a projection transform processing method.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described in the following order.
- A. Embodiment
- A-1. Trapezoidal Distortion Correction
- A-2. Configuration of Projector
- A-3. Trapezoidal Distortion Correcting Unit
- A-4. Prefetch Determination
- A-5. Hit Determination
- A-6. Advantages of Embodiments
- B. Modifications A. Embodiment A-1. Trapezoidal Distortion Correction A projector 100 according to an embodiment of the invention projects an image beam representing an image and displays the image on a projection plane such as a screen SC. The projector 100 is a projector which can correct a trapezoidal distortion of the image displayed on the screen SC and display a rectangular image thereon when the rectangular image is input thereto. A trapezoidal distortion correction in the projector 100 according to this embodiment will be described in brief before describing the configuration of the projector 100.

Figure 1:
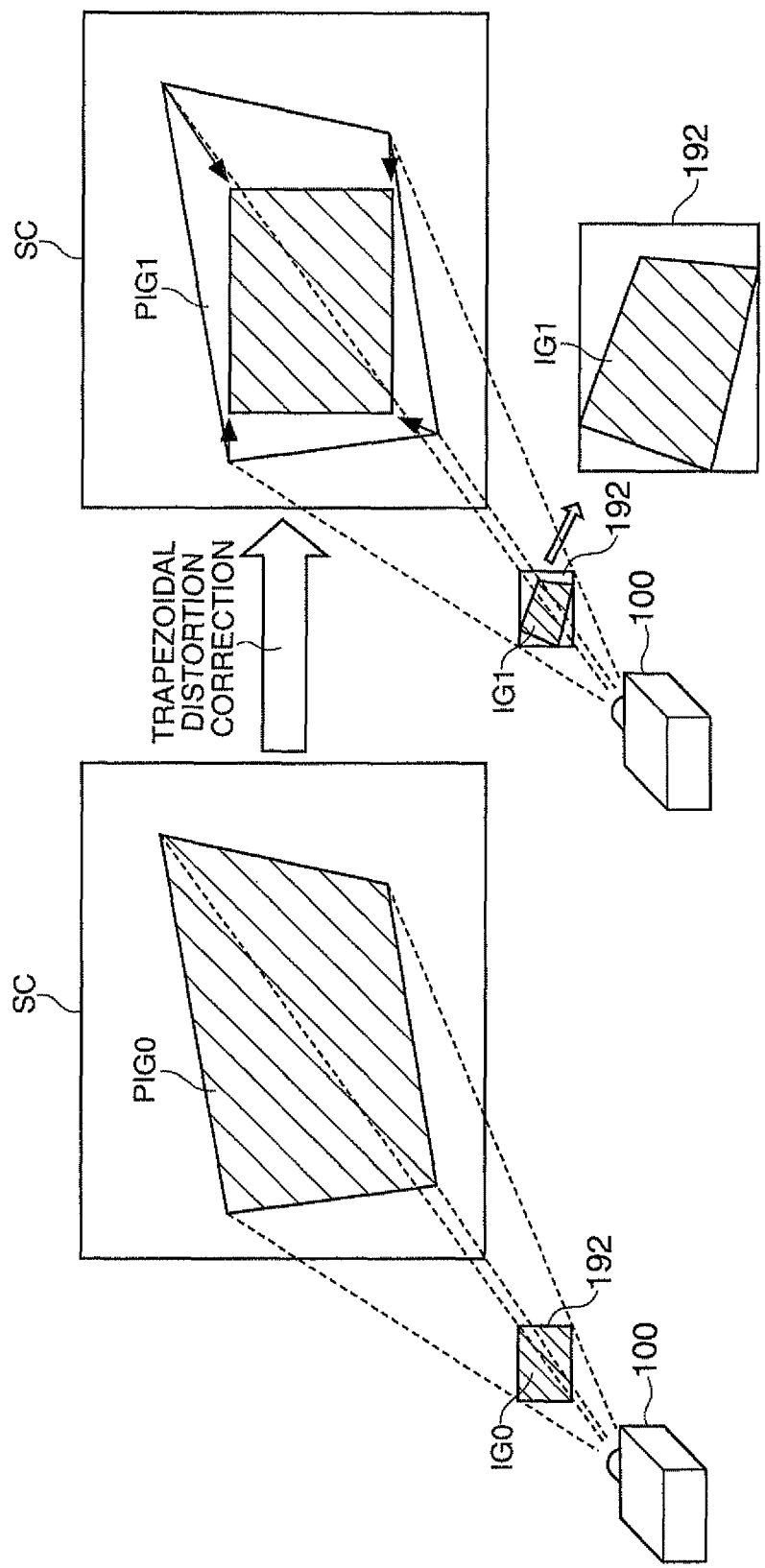
FIG. 1 is a diagram conceptually illustrating trapezoidal distortion correction.

FIG. 1 is a diagram conceptually illustrating the trapezoidal distortion correction. As shown in the drawing, when the projector 100 is inclined about the screen SC in the horizontal direction (right-and-left direction) and the vertical direction (up-and-down direction), an image (non-corrected image IG0) displayed on a liquid crystal panel unit 192 is rectangular but an image PIG0 projected onto the screen SC causes trapezoidal distortions in the horizontal direction and the vertical direction. In FIG. 1, the liquid crystal panel unit 192 included in the projector 100 is taken out of the projector 100 for the purpose of convenient explanation.

Accordingly, when an image (corrected image IG1) distorted reversely to the image projected onto the screen SC is formed on the liquid crystal panel unit 192 using a projection transform technique, a rectangular image PIG1 is displayed on the screen SC (FIG. 1). In this way, the process of correcting the image having been subjected to the trapezoidal distortion into the rectangular image (the image to be originally displayed) is called a trapezoidal distortion correction. The trapezoidal distortion correcting process in this embodiment corresponds to the correction process in the claims.

Figure 2:
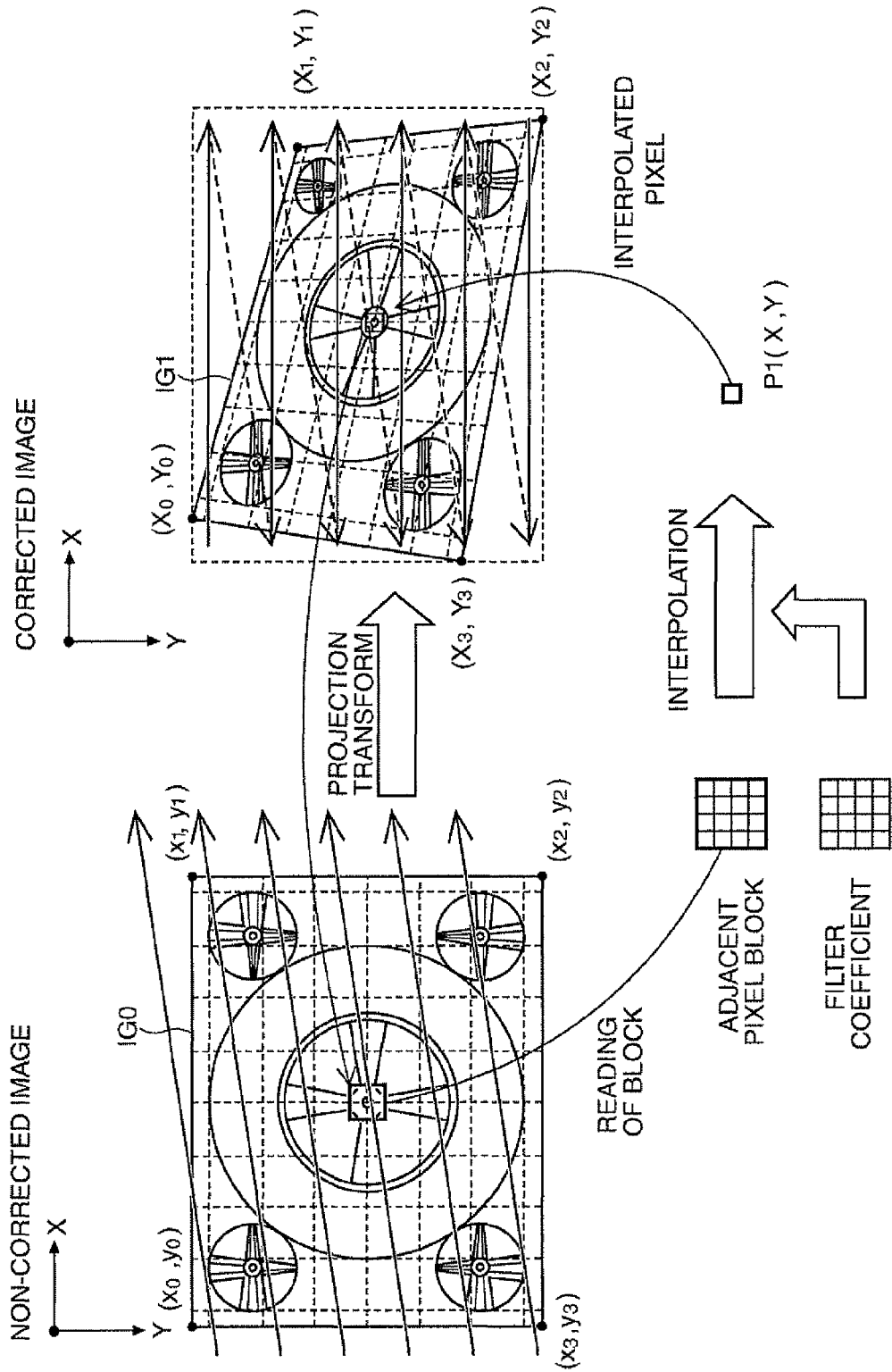
FIGS. 2A and 2B are diagrams conceptually illustrating a method of generating corrected image data.

FIGS. 2A and 2B are diagram sconceptually illustrating a method of generating corrected image data. FIG. 2A shows a non-corrected image IG0 and FIG. 2B shows a corrected image IG1. A dashed line in FIG. 2B indicates the outer shape of the non-corrected image IG0. Since the non-corrected image IG0 is subjected to an image process so as to be displayed in a full frame of the liquid crystal panel unit 192, the dashed line in FIG. 2B indicates the frame of the liquid crystal panel unit 192.

In this embodiment, the coordinates of the non-corrected image IG0 and the corrected image IG1 mean pixel coordinates when the non-corrected image IG0 and the corrected image IG1 are displayed on the liquid crystal panel unit 192. Hereinafter, the pixel coordinates of the liquid crystal panel unit 192 on which the corrected image IG1 is displayed are referred to as "corrected coordinates". The pixel coordinates of an area where the corrected image IG1 is not displayed out of the pixel coordinates of the liquid crystal panel unit 192 are mentioned using the corrected coordinates. Coordinates obtained by inversely transforming the corrected coordinates into coordinate positions (the pixel coordinates of the liquid crystal panel) in the non-corrected image IG0 by inverse projection transform are referred to as "non-corrected coordinates".

The concept of the method of generating corrected image data representing the corrected image IG1 will be described with reference to FIGS. 2A and 2B. When it is intended to generate the corrected image data, the pixel values (values of R, G, and B) of all the pixel coordinates in the corrected image IG1 are calculated on the basis of the pixel values of the non-corrected image IG0. For example, a method of calculating the pixel value of a coordinate P1(X, Y) surrounded with a rectangle at the center of the corrected image IG1 shown in FIGS. 2A and 2B will be described.

First, the corrected coordinate P1(X, Y) of which the pixel value is intended to be calculated is transformed to a non-corrected coordinate P0(x, y). Since the non-corrected image IG0 and the corrected image IG1 do not have an integral correspondence, the calculated non-corrected coordinate P0(x, y) includes a decimal part. Accordingly, when it is intended to calculate the pixel value of the corrected coordinate P1(X, Y), the pixel value of the non-corrected coordinate P0(x, y) is estimated using the pixel values of 16 coordinates around the non-corrected coordinate P0(x, y). This is referred to as pixel interpolation. Accordingly, 16 pixels (hereinafter, referred to as an "interpolation block") adjacent thereto are read on the basis of the transformed non-corrected coordinate P0(x, y) and the pixel interpolation is performed using filter coefficients. As a result, the pixel value of the coordinate P1(X, Y) in the corrected image IG1 is obtained. That is, the corrected image data representing the corrected image IG1 is generated by performing the pixel interpolation on the pixel values of all the pixels (coordinates) of the corrected image IG1 for each pixel.

Figure 3:
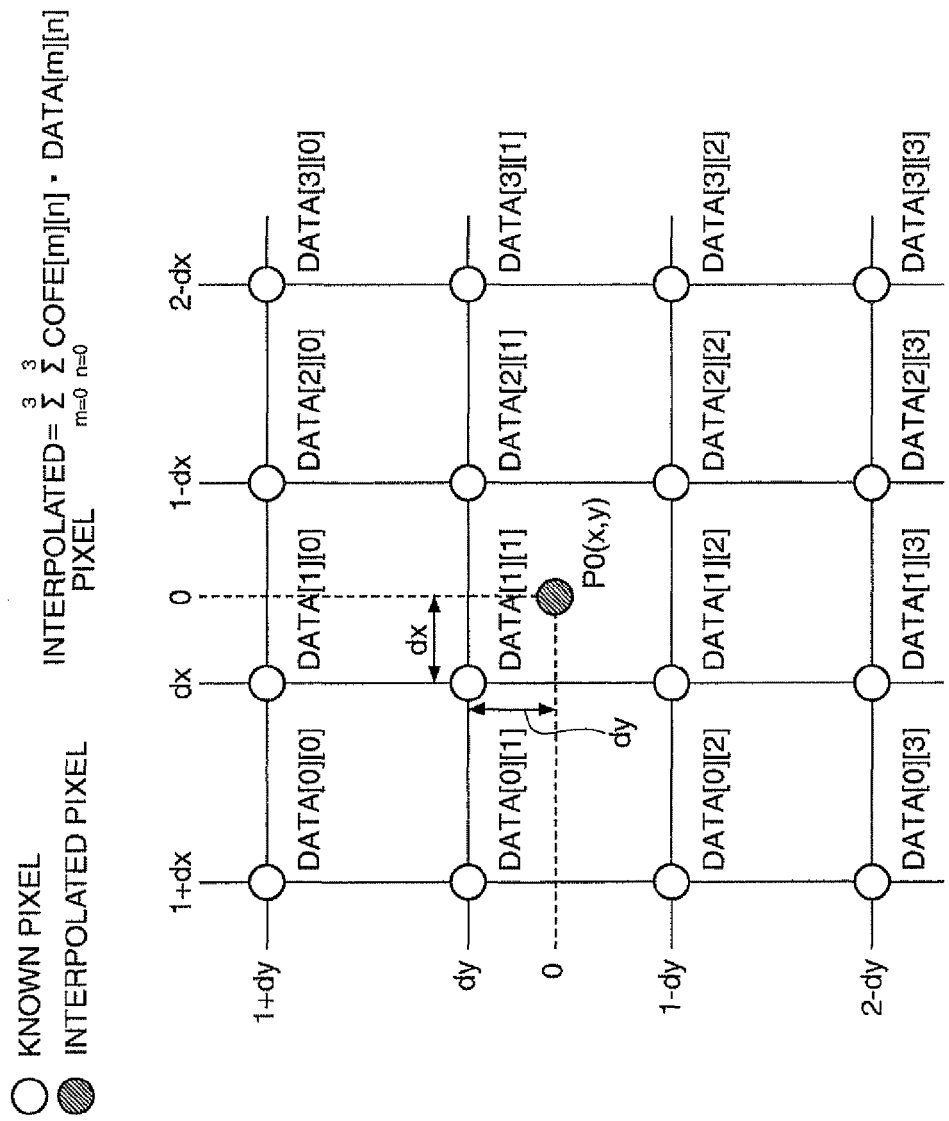
FIG. 3 is a diagram conceptually illustrating a pixel interpolation method.

FIG. 3 is a diagram conceptually illustrating a pixel interpolation method. FIG. 3 shows a method of obtaining the pixel value of the non-corrected coordinate P0(x, y) transformed from the corrected coordinate P1(X, Y) by the pixel interpolation. In the drawing, the non-corrected coordinate P0(x, y) is indicated by a hatched circle and the 16 coordinates adjacent thereto are indicated by white circles. Since the pixel value of the non-corrected coordinate P0(x, y) can be obtained by the pixel interpolation, the pixel value of the non-corrected coordinate P0(x, y) is referred to as an "interpolated pixel", and the pixel values of the 16 coordinates adjacent thereto are referred to as "known pixels" because the pixel values are the non-corrected image data and are known.

In FIG. 3, the pixel values of the 16 pixels as the known pixels are expressed by DATA[m] [n] (where m=0, 1, 2, 3 (x direction) and n=0, 1, 2, 3 (y direction)). The interpolated pixel is calculated by performing the convolution operation on the pixel values of the 16 pixels and the filter coefficients. The filter coefficient is a coefficient obtained by considering the influence of the distance between the interpolated pixel and the known pixels (for example, the distances between the known pixel and the interpolated pixel in DATA[1] [1] is dx in the x direction and dy in the y direction) and is determined for each known pixel. In FIG. 3, the filter coefficients are expressed by COEF[m] [n] (where m=0, 1, 2, 3 (x direction) and n=0, 1, 2, 3 (y direction)). In this embodiment, two-dimensional filter coefficients are used, but the filter coefficients may be broken down one-dimensionally.

A-2. Configuration of Projector

Figure 4:
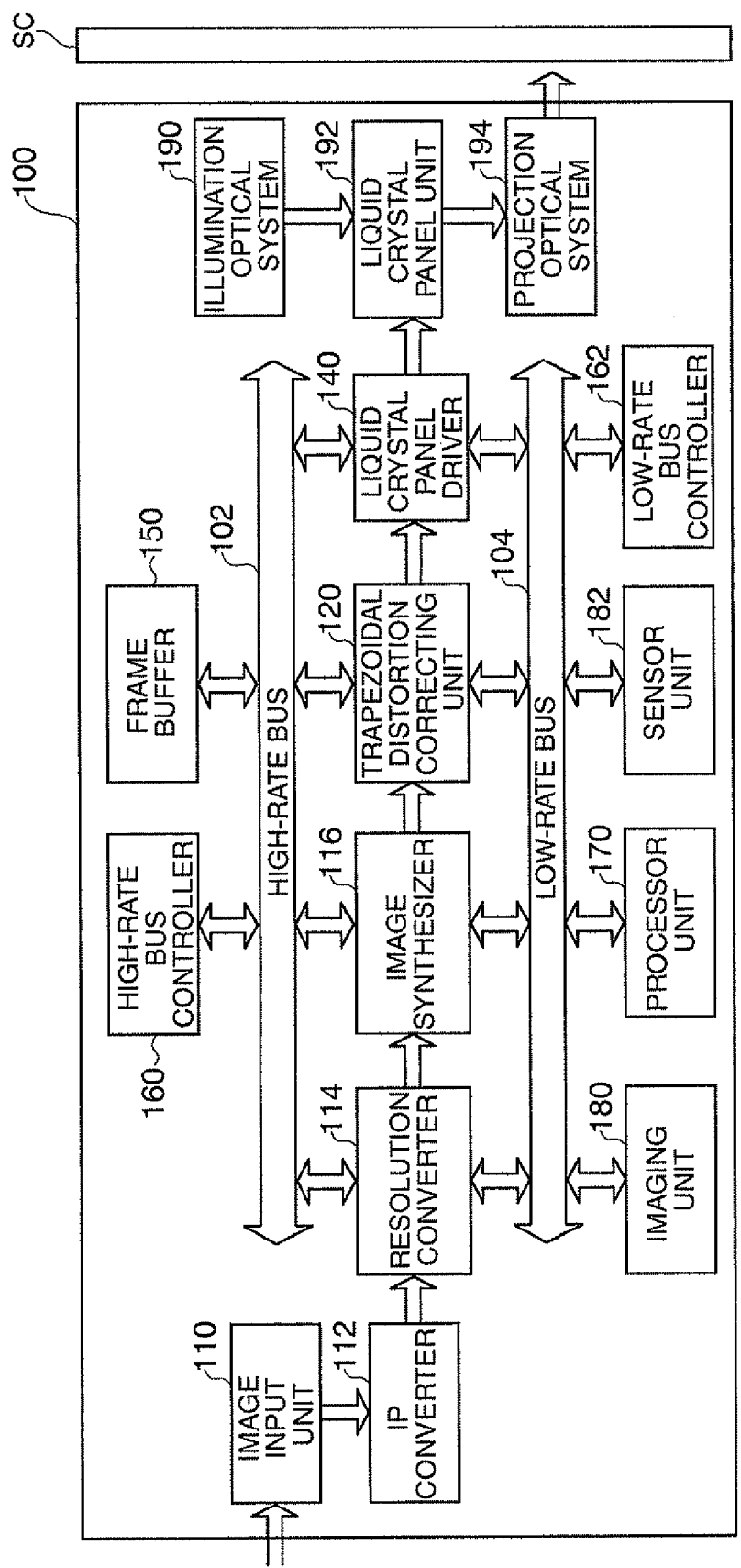
FIG. 4 is a block diagram schematically illustrating the configuration of a projector according to an embodiment of the invention.

FIG. 4 is a block diagram schematically illustrating the configuration of a projector according to an embodiment of the invention. As shown in the drawing, the projector 100 includes an image input unit 110, an IP converter 112, resolution converter 114, an image synthesizer 116, a trapezoidal distortion correcting unit 120, a liquid crystal panel driver 140, a frame buffer 150, a high-rate bus controller 160, a low-rate bus controller 162, a processor unit 170, an imaging unit 180, a sensor unit 182, an illumination optical system 190, a liquid crystal panel unit 192, a projection optical system 194. Out of these elements, the elements other than the illumination optical system 190, the liquid crystal panel unit 192, and the projection optical system 194 are connected to each other via a high-rate bus 102 or a low-rate bus 104.

The image input unit 110 performs an A/D conversion operation on an input image signal input from a DVD player or a personal computer (not shown) via a cable as needed and supplies a digital image signal to the IP converter 112.

The IP converter 112 performs a process of converting the format of the image data supplied from the image input unit 110 from an interlaced mode to a progressive mode and supplies the obtained image data to the resolution converter 114.

The resolution converter 114 performs a size increasing process or a size decreasing process (that is, a resolution conversion process) on the image data supplied from the IP converter 112 and supplies the obtained image data to the image synthesizer 116.

The image synthesizer 116 synthesizes the image data supplied from the resolution converter 114 with an OSD (On Screen Display) such as a menu picture and writes the resultant as non-corrected image data to the frame buffer 150.

The frame buffer 150 can store data of one frame or plural frames. In this embodiment, a DRAM (Dynamic Random Access Memory) which is cheap and has a large capacity is used as the frame buffer 150. The frame buffer 150 in this embodiment corresponds to the frame image storage unit in the claims.

The trapezoidal distortion correcting unit 120 corrects a trapezoidal distortion caused when the projection is performed in the state where the projection axis of the projector 100 is inclined about the screen SC. Specifically, in order to display the non-corrected image, which is represented by the non-corrected image data stored in the frame buffer 150, in a shape for compensating for the trapezoidal distortion on the liquid crystal panel unit 192, the correction process is performed on the non-corrected image data and is supplied as the corrected image data to the liquid crystal panel driver 140. The trapezoidal distortion correcting unit 120 will be described in detail later.

The liquid crystal panel driver 140 drives the liquid crystal panel unit 192 on the basis of the digital image signal input via the trapezoidal distortion correcting unit 120. The liquid crystal panel unit 192 includes a transmissive liquid crystal panel in which plural pixels are arranged in a matrix shape. The liquid crystal panel unit 192 is driven by the liquid crystal panel driver 140 and forms an image for modulating an illumination image applied from the illumination optical system 152 into an effective image beam representing an image by varying the light transmittance of the pixels arranged in a matrix shape. In this embodiment, the mode of the liquid crystal panel unit 192 is WUXGA and the resolution is 1920× 1200 dots. In this embodiment, the pixel coordinates on the liquid crystal panel are defined by x–0 to 1919 and y=0 to 1199. The liquid crystal panel unit 192 may have a resolution different from that in this embodiment.

The illumination optical system 152 includes lamps such as high-pressure mercury lamps or extra-high-pressure mercury lamps or other light emitters. The projection optical system 194 is attached to the front surface of the chassis of the projector 100 and enlarges the beam modulated into the image beam by the liquid crystal panel unit 192 and projects the enlarged beam onto the screen SC. The illumination optical system 194 includes a zoom lens (not shown) and can change a degree of enlargement (zoom state) at the time of projecting the beam passing through the liquid crystal panel unit 192. The liquid crystal panel driver 140, the liquid crystal panel unit 192, the illumination optical system 190, and the projection optical system 194 in this embodiment correspond to the image beam output unit in the claims.

The processor unit 170 controls the operations of the elements of the projector 100 by reading and executing a control program stored in a storage unit (not shown). The processor unit also calculates corrected coordinates (X0 to X3 and Y0 to Y3) (see FIGS. 2A and 2B) to be described later and transformation coefficients (to be described in detail later) of a coordinate transformation matrix on the basis of a captured image captured by the imaging unit 180, the inclination of the projector 100 detected by the sensor unit 182, and an instruction from a user, and outputs the calculated results to the trapezoidal distortion correcting unit 120. In this embodiment, the processor unit 170 receives the instruction from the user via an operation panel (not shown) disposed in the body of the projector 100, but a remote controller control unit may receive the instruction from the user via a remote controller and the processor unit 170 may receive the instruction from the user via the low-rate bus 104.

The imaging unit 180 includes a CCD camera and generates a captured image. The captured image generated by the imaging unit 180 is stored in a captured image memory (not shown). The imaging unit 180 may include another imaging device instead of the CCD camera.

The sensor unit 182 can detect an inclination angle formed by the CCD optical axis of the imaging unit 180 and a horizontal plane by detecting the inclination of the projector 100 about the vertical direction.

A-3. Trapezoidal Distortion Correcting Unit

Figure 5:
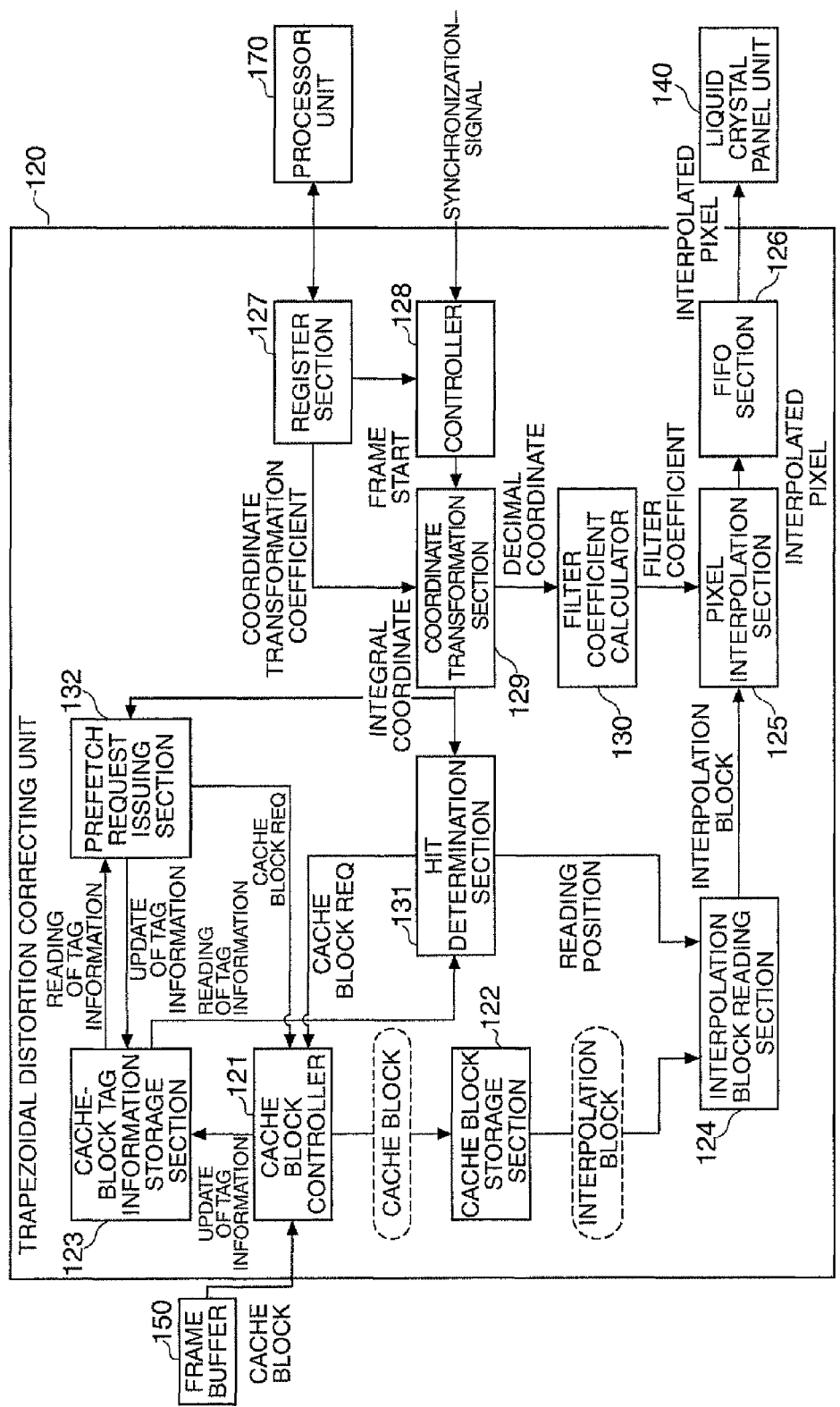
FIG. 5 is a functional block diagram illustrating the configuration of a trapezoidal distortion correcting unit.

As described above, the trapezoidal distortion correcting unit 120 generates corrected image data which is obtained by correcting a non-corrected image represented by the non-corrected image data stored in the frame buffer 150 into a shape for compensating for the trapezoidal distortion. FIG. 5 is a functional block diagram illustrating the configuration of the trapezoidal distortion correcting unit 120. The trapezoidal distortion correcting unit 120 includes a cache block controller 121, a cache block storage section 122, a cache-block tag information storage section 123, an interpolation block reading section 124, a pixel interpolation section 125, an FIFO section 126, a register section 127, a controller 128, a coordinate transformation section 129, a filter coefficient calculator 130, a hit determination section 131, and a prefetch request issuing section 132.

The cache block controller 121 acquires the non-corrected image data stored in the frame buffer 150 in terms of a cache block including 8×8 pixels and stores the acquired non-corrected image data in the cache block storage section 122. The cache block controller 121 updates the tag information stored in the cache-block tag information storage section 123. The cache block acquired by the cache block controller 121 is designated by the hit determination section 131 or the prefetch request issuing section 132 as described later.

The cache block storage section 122 can store some data of the non-corrected image data, corresponding to one frame and being stored in the frame buffer 150, in terms of a cache block including 8×8 pixels. The cache block storage section 122 includes plural block areas each storing one cache block (image data including 8×8 pixels). In this embodiment, as described in detail later, the cache block storage section 122 includes block areas of 240 columns×4 rows. In this embodiment, the cache block storage section 122 is formed of an SRAM (Static Random Access Memory) having a small capacity and a high rate. The cache block storage section 122 in this embodiment corresponds to the block image storage unit in the claims.

The cache-block tag information storage section 123 stores tag information which is management information for Managing the cache block storage section 122 in terms of the block area. The cache-block tag information storage section 123 in this embodiment corresponds to the tag information storage unit in the claims.

The interpolation block reading section 124 reads an interpolation block including 4×4 pixels necessary for the pixel interpolation in the pixel interpolation section 125 from the cache block storage section 122 and supplies the read interpolation block to the pixel interpolation section 125.

The pixel interpolation section 125 performs a pixel interpolation process on the basis of the interpolation block supplied from the interpolation block reading section 124 and the filter coefficient supplied from the filter coefficient calculator 130, calculates values of the interpolated pixels (pixels of the corrected image), and outputs the calculated values to the liquid crystal panel driver 140 (see FIG. 4) via the FIFO section 126.

The register unit 127 stores parameters supplied from the processor unit 170. Specifically, the register unit 127 stores parameters such as a frame width and a frame height of one frame of the non-corrected image and transformation coefficients A to H of a coordinate transformation matrix. The transformation coefficients A to H are calculated by the processor unit 170 using the following matrix expression of projection transform (Expression (1)). Specifically, the processor unit 170 inputs four coordinates (X0 to X3, Y0 to Y3) of the corrected image IG1 to the matrix expression (Expression (1)) to derive coefficients A to H, where non-corrected coordinates (x0 to x3, y0 to y3) (see FIGS. 2A and 2B) are transformed into corrected coordinates (X0 to X3, Y0 to Y3) (see FIGS. 2A and 2B) by the projection transform.

$$\begin{pmatrix} X_0 & Y_0 & 1 & 0 & 0 & 0 & -x_0X_0 & -x_0Y_0 \\ 0 & 0 & 0 & X_0 & Y_0 & 1 & -y_0X_0 & -y_0Y_0 \\ X_1 & Y_1 & 1 & 0 & 0 & 0 & -x_1X_1 & -x_1Y_1 \\ 0 & 0 & 0 & X_1 & Y_1 & 1 & -y_1X_1 & -y_1Y_1 \\ X_2 & Y_2 & 1 & 0 & 0 & 0 & -x_2X_2 & -x_2Y_2 \\ 0 & 0 & 0 & X_2 & Y_2 & 1 & -y_2X_2 & -y_2Y_2 \\ X_3 & Y_3 & 1 & 0 & 0 & 0 & -x_3X_3 & -x_3Y_3 \\ 0 & 0 & 0 & X_3 & Y_3 & 1 & -y_3X_3 & -y_3Y_3 \end{pmatrix} \begin{pmatrix} A \\ B \\ C \\ D \\ E \\ F \\ G \\ H \end{pmatrix} = \begin{pmatrix} x_0 \\ y_0 \\ x_1 \\ y_1 \\ x_2 \\ y_2 \\ x_3 \\ y_3 \end{pmatrix} \quad (1)$$

In this embodiment, before starting the corrected image data generating process, the image PIG0 displayed on the screen SC before the trapezoidal distortion correction is captured by the imaging unit 180. The processor unit 170 (see FIG. 4) calculates the coordinates (X0 to X3, Y0 to Y3) (see FIG. 2B) of four vertexes in the corrected image IG1 after the trapezoidal distortion correction on the basis of the captured image.

The inclination of the projector 100 about the vertical direction may be detected by the use of the sensor unit 182 and the corrected coordinates (X0 to X3, Y0 to Y3) may be calculated on the basis of the detected angle. A user may operate the remote controller to manually perform the trapezoidal distortion correction. In this case, the processor unit 170 calculates the corrected coordinates (X0 to X3, Y0 to Y3) on the basis of the user's instruction received via the remote controller control unit.

The controller 128 controls the trapezoidal distortion correcting unit 120 as a whole. For example, the controller 128 outputs a frame start signal representing the start of a frame to the coordinate transformation section 129 in accordance with a synchronization signal input to the controller 128. The synchronization signal is input every 1/60 second, for example, when 60 frames are displayed per second.

The coordinate transformation section 129 transforms the coordinate values (corrected coordinates) of the corrected image IG1 having been subjected to the trapezoidal distortion correction into the coordinate values (non-corrected coordinates) of the non-corrected image IG0 (rectangular image) using the coordinate transformation coefficients A to H supplied from the register section 127 and Expressions (2) and (3). Since the non-corrected image IG0 and the corrected image IG1 do not have an integral correspondence, the non-corrected coordinates calculated by the coordinate transformation section 129 include decimal parts. The coordinate transformation section 129 divides a non-corrected coordinate into an integral part and a decimal part, supplies the integral part to the hit determination section 131 and the prefetch request issuing section 132, and supplies the decimal part to the filter coefficient calculator 130.

Here, the method of calculating the non-corrected coordinates will be described. Since the corrected image IG1 is considered as an image obtained by projection-transforming the non-corrected image IG0, the non-corrected coordinates are calculated by inversely projection-transforming the corrected coordinates using Expressions (2) and (3). It is assumed that the non-corrected coordinates (x, y) are transformed into the corrected coordinates (X, Y) by the projection transform.

$$x = \frac{AX + BY + C}{GX + HY + 1} \quad (2)$$

$$y = \frac{DX + EY + F}{GX + HY + 1} \quad (3)$$

The coefficients A to H in Expressions (2) and (3) are stored in the register section 127.

The filter coefficient calculator 130 selects the filter coefficients used to perform the pixel interpolation process from a filter coefficient table on the basis of the decimal parts supplied from the coordinate transformation section 129 and supplies the selected filter coefficients to the pixel interpolation section 125. The filter coefficient table is a table representing the relations of the filter coefficients and the distances between the interpolated pixel and the known pixels shown in FIG. 3, and previously-calculated results are stored in a memory of the filter coefficient calculator 130. The pixel interpolation section 125, the coordinate transformation section 129, and the filter coefficient calculator 130 in this embodiment correspond to the correction processing unit in the claims.

The hit determination section 131 determines whether the pixel values of the coordinates used for the pixel interpolation in the pixel interpolation section 125 are stored in the cache block storage section 122 on the basis of the integral parts of the non-corrected coordinates supplied from the coordinate transformation section 129. Hereinafter, this determination is referred to as "hit determination". If it is determined in the hit determination that the pixel values necessary for the pixel interpolation are not stored in the cache block storage section 122, the hit determination section 131 gives a necessary cache block acquiring request to the cache block controller 121. If it is determined in the hit determination that the pixel values necessary for the pixel interpolation are stored in the cache block storage section 122, the hit determination section supplies the reading position in the cache block storage section 122 to the interpolation block reading section 124. The flow of the hit determination process will be described later. The hit determination section 131 in this embodiment corresponds to the determination unit in the claims.

The prefetch request issuing section 132 predicts a cache block necessary for a next pixel interpolation process on the basis of the integral parts of the non-corrected coordinates supplied from the coordinate transformation section 129, and stores the predicted cache block in the cache block storage section 122. The specific process thereof will be described later. The prediction of the cache block is also referred to as "prediction determination". The prefetch request issuing section 132 in this embodiment corresponds to the block image predicting unit in the claims. While the trapezoidal distortion correcting unit 120 performs the correction process on a predetermined pixel, the prefetch request issuing section 132 predicts the block image data necessary for the correction process on a pixel to be processed after the predetermined pixel. If the predicted block image data is not stored in the cache block storage section 122, the prefetch request issuing section 132 reads the predicted block image data from the frame buffer 150 and stores the predicted block image data in the cache block storage section 122.

Figure 6:
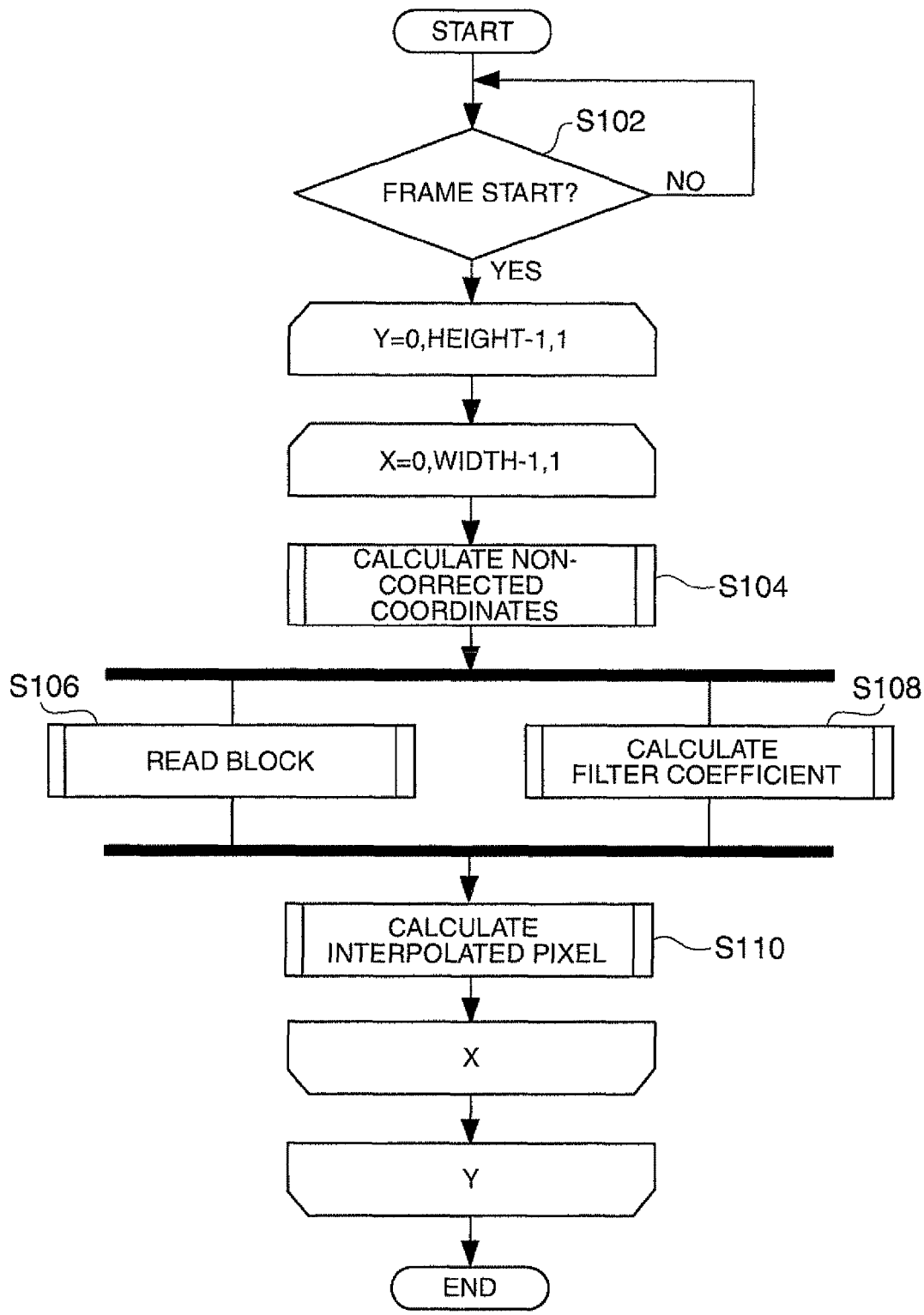
FIG. 6 is a flow diagram schematically illustrating the flow of a corrected image data generating process.

FIG. 6 is a flow diagram schematically illustrating the flow of a corrected image data generating process. The coordinate transformation section 129 (see FIG. 5) determines whether the frame start signal is input (step S102). The coordinate transformation section 129 waits (NO in step S102) until the frame start signal is input, and transforms the coordinates (corrected coordinates) of the corrected image to obtain the non-corrected coordinate as described above (step S104) when the frame start signal is input (YES instep S102).

When the hit determination section 131 (see FIG. 5) supplies the reading position of the interpolation block to the interpolation block reading section 124 on the basis of the integral parts of the non-corrected coordinates calculated by the coordinate transformation section 129, the interpolation block reading section 124 (see FIG. 5) reads the interpolation block from the cache block storage section 122 on the basis of the supplied reading position (step S106). On the other hand, the filter coefficient calculator 130 (see FIG. 5) selects the filter coefficients from the filter coefficient table on the basis of the decimal parts of the non-corrected coordinates calculated in step S104. The block reading process in the hit determination section 131 and the interpolation block reading section 124 and the filter coefficient calculating process in the filter coefficient calculator 130 are simultaneously performed and the process of step S110 is performed when both processes are ended.

The pixel interpolation section 125 (see FIG. 5) calculates the pixel values of the corrected coordinates by the convolution operation using the supplied interpolation block and the filter coefficients (step S110), when the interpolation block is supplied from the interpolation block reading section 124 and the filter coefficients are supplied from the filter coefficient calculator 130.

By repeatedly performing the processes of steps S104 to S110 on the corrected coordinates (X, Y)=(0, 0) to (frame width-1, frame height-1), the corrected image data is generated. In this embodiment, since the frame width is 1920 and the frame height is 1200, the processes of steps S104 to S110 are repeatedly performed on the corrected coordinates (X, Y)=(0, 0) to (1919, 1199). When the frame width and the frame height are not different from those of this embodiment, the corrected image data is generated by repeatedly performing the processes of steps S104 to S110 on the corrected coordinates (X, Y)=(0, 0) to (frame width-1, frame height-1)

Figure 7:
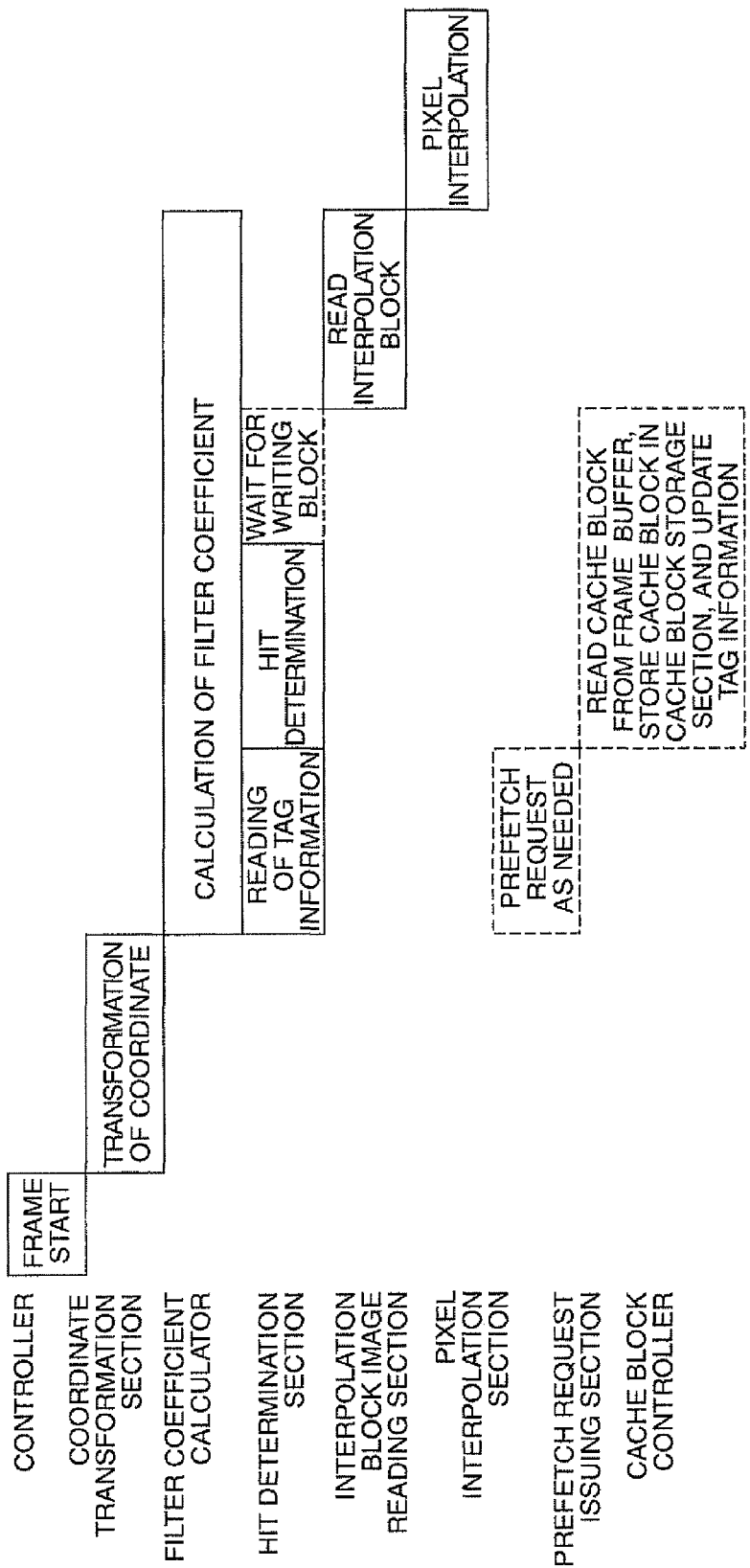
FIG. 7 is a timing diagram illustrating processing times in calculating a pixel value of a pixel in a corrected image.

FIG. 7 is a timing diagram illustrating processing times in calculating the pixel value of a pixel in the corrected image. When the controller 128 outputs the frame start signal and the coordinate transformation section 129 receives the frame start signal, the coordinate transformation section 129 starts the coordinate transforming process. When the coordinate transforming process in the coordinate transformation section 129 is ended (the non-corrected coordinates are calculated), the filter coefficient calculator 130 starts the filter coefficient calculating process and the hit determination section 131 starts the tag information reading process for the hit determination.

When it is determined as the hit determination result in the hit determination section 131 that the interpolation block to be read is not stored in the cache block storage section 122, the hit determination section 131 waits until the cache block including the interpolation block to be read is stored in the cache block storage section 122 (hereinafter, referred to as "block writing waiting time").

At the same time as performing the filter coefficient calculating process and the tag information reading process, the prefetch request issuing section 132 determines whether the prefetch request is necessary or unnecessary and issues the prefetch request when it is determined that the prefetch request is necessary. When the request for reading the cache block is issued from the hit determination section 131 or the prefetch request issuing section 132, the cache block controller 121 reads the cache block from the frame buffer 150 and stores the read cache block in the cache block storage section 122. When the cache block including the interpolation block to be read is stored in the cache block storage section 122 and the hit determination section 131 performs the hit determination, the interpolation block reading section 124 reads the interpolation block.

When the filter coefficient calculating process in the filter coefficient calculator 130 and the interpolation block reading process are ended, the pixel interpolation section 125 starts the pixel interpolation process. In FIG. 7, solid frames represent that the processing time is fixed and dashed frames represent that the processing time is variable. The length of the frame in FIG. 7 does not represent the length of a process. In this embodiment, the block writing waiting time in the hit determination section is shortened by issuing the prefetch request.

A-4. Prefetch Determination

Before describing the prefetch determining in the prefetch request issuing section 132, the configurations of cache block storage section 122 and the cache-block tag information storage section 123, the cache block, and the interpolation block in this embodiment will be described in detail.

Figure 8:
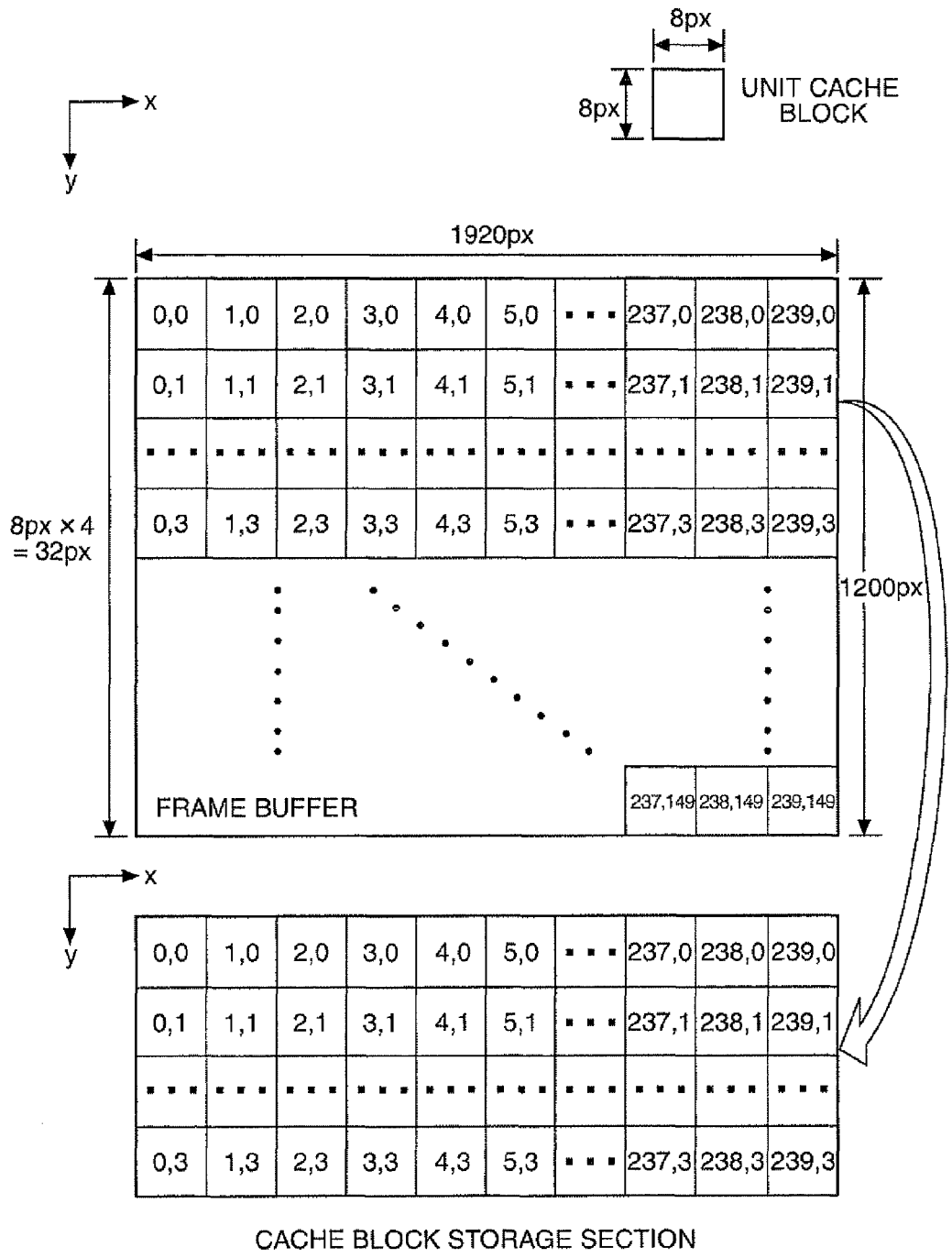
FIG. 8 is a diagram schematically illustrating the relationship between a frame buffer and a cache block storage section.
Figure 9:
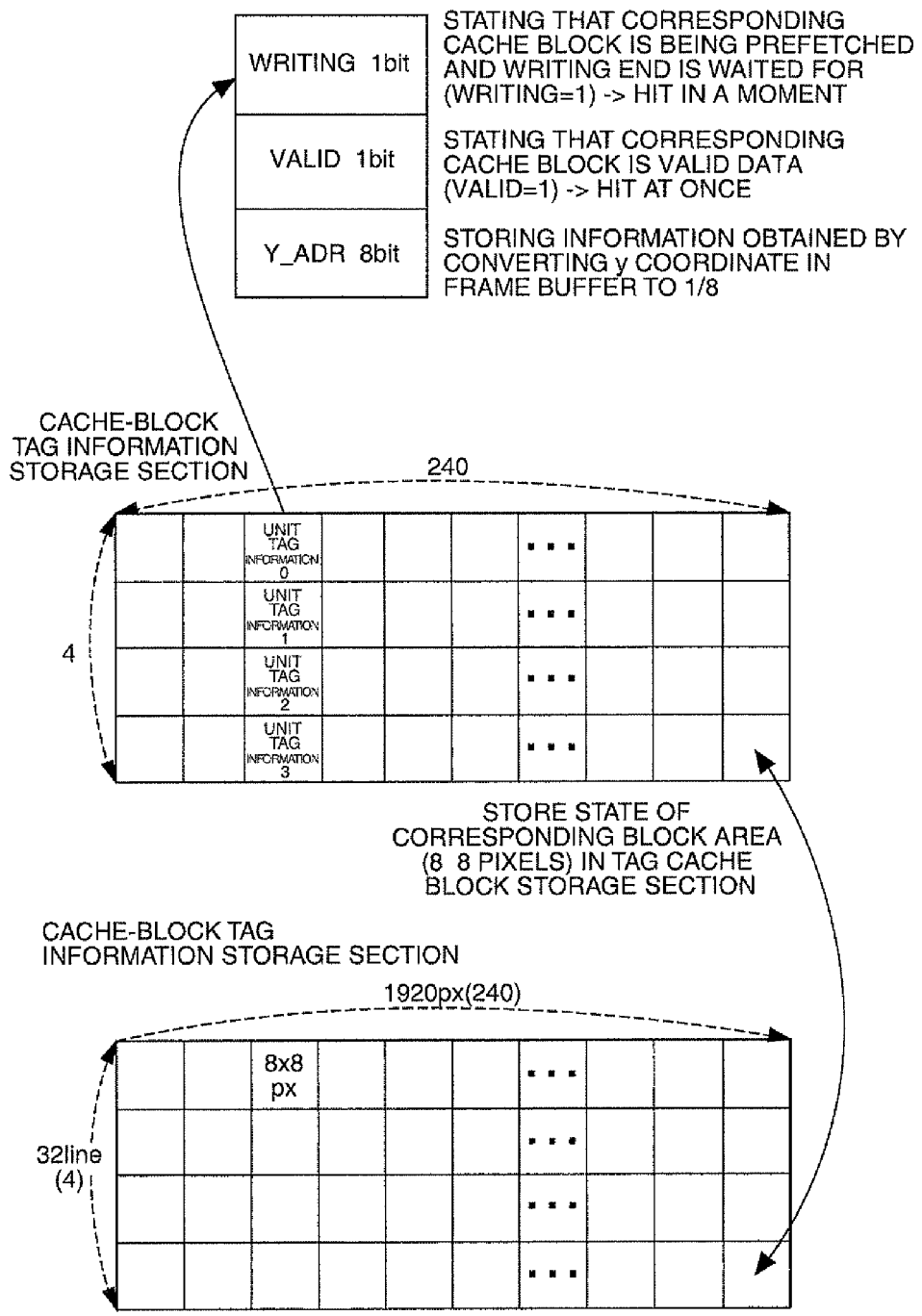
FIG. 9 is a diagram conceptually illustrating the relationship between the cache block storage section and a cache-block tag information storage section.

FIG. 8 is a diagram schematically illustrating the relationship between the frame buffer 150 and the cache block storage section 122. FIG. 9 shows a state where the non-corrected image data of one frame stored in the frame buffer 150 is divided in terms of a cache block including 8×8 pixels. In this embodiment, the non-corrected image data stored in the frame buffer 150 includes 1920×1200 pixels and the non-corrected image data is divided into 240×150 cache blocks. A text (x, y) described in each cache block represents positions (column number, row number) in the x direction and the y direction of the corresponding cache block. In this embodiment, the direction in which the columns are arranged is set as the x direction and the direction in which the rows are arranged is set as the y direction. The x direction in this embodiment corresponds to the line direction in the claims and the y direction corresponds to the pixel direction in the claims.

The cache block storage section 122 includes 240 columns×4 rows block areas each storing one cache block. In FIG. 8, numbers (column (0 to 239), row (0 to 3)) are given to identify the block areas. Some data (corresponding to 240×4 cache blocks) of the non-corrected image of one frame stored in the frame buffer 150 can be stored in the cache block storage section 122.

In this embodiment, when the trapezoidal distortion correcting process is started, the cache blocks (0, 0) to (239, 3) are read from the frame buffer 150 and are stored in the cache block storage section 122. The cache blocks are stored in block areas having the same column numbers as the column numbers of the cache blocks in the cache block storage section 122. Therefore, in order to start the trapezoidal distortion correcting process, a cache block having the same column number and row number as the column number and row number of the corresponding block area is stored in each block area of the cache block storage section 122 (see FIG. 8). That is, the width of the cache block storage section 122 is the same as that of the frame buffer 150, the height of the cache block storage section 122 corresponds to four cache blocks, and pixel data of 32 lines (4 cache blocks×8 pixels) of one frame is stored in the cache block storage section 122. Since the cache blocks are sequentially stored in the order of the column numbers of the frame buffer 150 in the cache block storage section 122, it is possible to perform the hit determination and search in the x direction at a high rate, which will be described later.

The cache-block tag information storage section 123 stores the tag information which is management information for managing the cache block storage section 122 in terms of a block area. FIG. 9 is a diagram conceptually illustrating the relationship between the cache block storage section 122 and the cache-block tag information storage section 123. As shown in the drawing, 240×4 pieces of tag information are stored in the cache-block tag information storage section 123 so as to correspond to 240×4 block areas of the cache block storage section 122.

Specifically, the following three pieces of information are stored as the tag information. That is, (1) information representing whether the writing from the frame buffer 150 to the cache block storage section 122 is waited for (WRITING=1 when the writing is waited for), (2) information representing whether data in each block area is valid (VALID=1 when the data is valid and VALID=0 when the data is invalid), and (3) a coordinate Y_ADR representing a position of a block in the frame buffer 150 corresponding to a cache block stored in a block area are stored. The coordinate Y_ADR in (3) represents information obtained by converting the y coordinate in the frame buffer 150 corresponding to the upper-left-end pixel of a cache block into ⅛. In this embodiment, the row numbers shown in FIG. 8 are used as the coordinates Y_ADR. In (2), "valid" means that pixel value data of a block of the corresponding Y_ADR in the frame buffer 150 is stored in a cache block and the hit determination is possible, and "invalid" means that invalid pixel value data is stored in a cache block and the hit termination is not possible. In this embodiment, at the time of starting the trapezoidal distortion correcting process, "invalid (VALID=0)" is set in all tag information before the cache blocks of (0, 0) to (239, 3) are stored in the cache block storage section 122.

Figure 10:
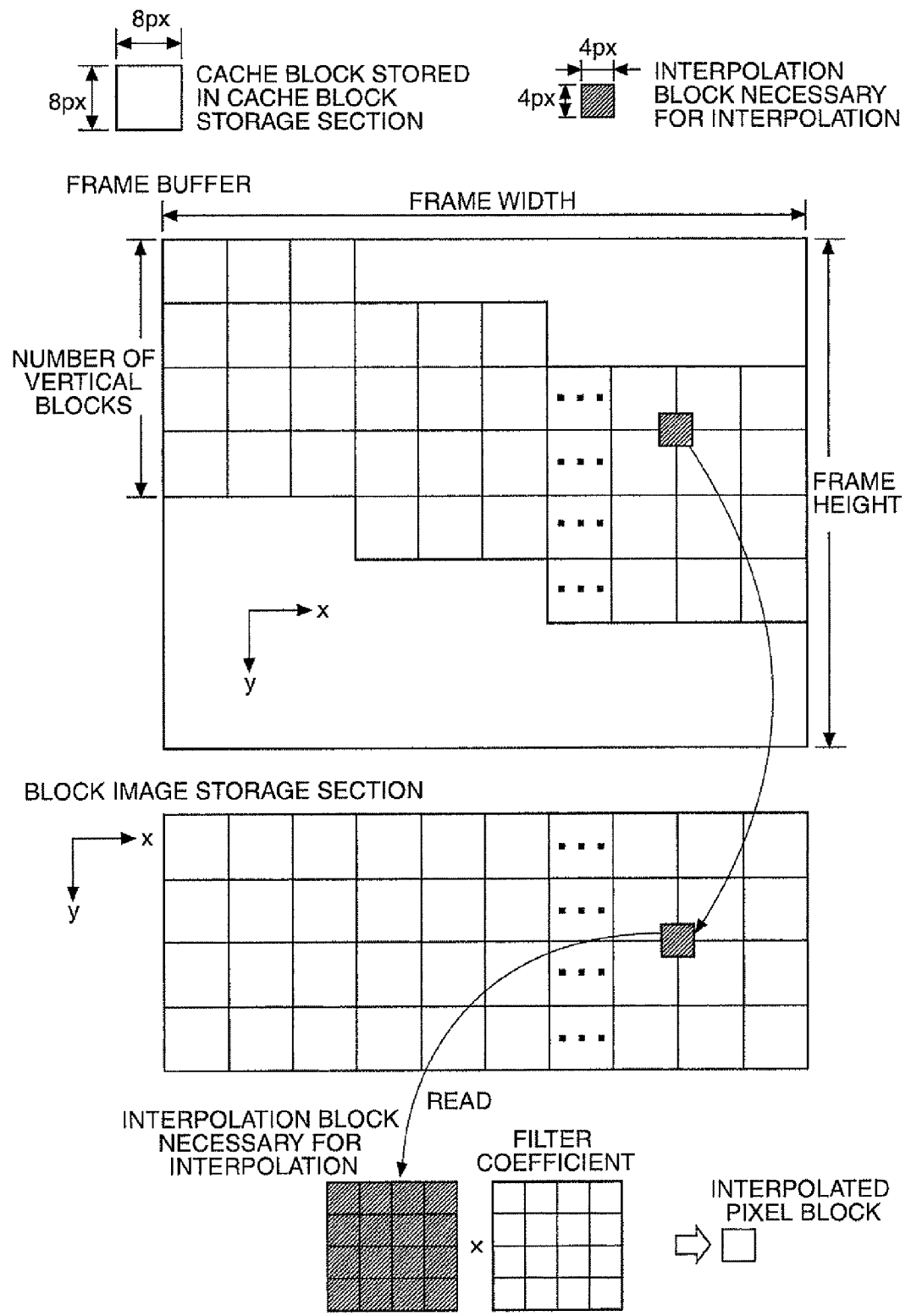
FIG. 10 is a diagram illustrating the relationship between a cache block and an interpolation block.

FIG. 10 is a diagram illustrating the relationship between a cache block and an interpolation block. In FIG. 10, the interpolation block is hatched. In this embodiment, since a cache block includes 8×8 pixels and an interpolation block includes 4×4 pixels, the interpolation block constitutes a part of the cache block.

The interpolation block can have the following states: (1) a state where it is included in one cache block; (2) a state where it extends over two cache blocks adjacent to each other in the y direction; (3) a state where it extends over two cache blocks adjacent to each other in the x direction; and (4) a state where it extends over four cache blocks of 2 rows×2 columns. FIG. 10 shows the state of (4) where the interpolation block extends over four cache blocks of 2 rows×2 columns.

As described later, the cache blocks stored in the cache block storage section 122 are updated as the trapezoidal distortion correcting process advances. Therefore, in the course of the trapezoidal distortion correcting process, as shown in FIG. 10, the cache blocks stored in the cache block storage section 122 are located at the shown positions in the frame buffer 150. The interpolation block necessary for the pixel interpolation is read on the basis of the position information supplied from the hit determination section 131 as described later.

Figure 11:
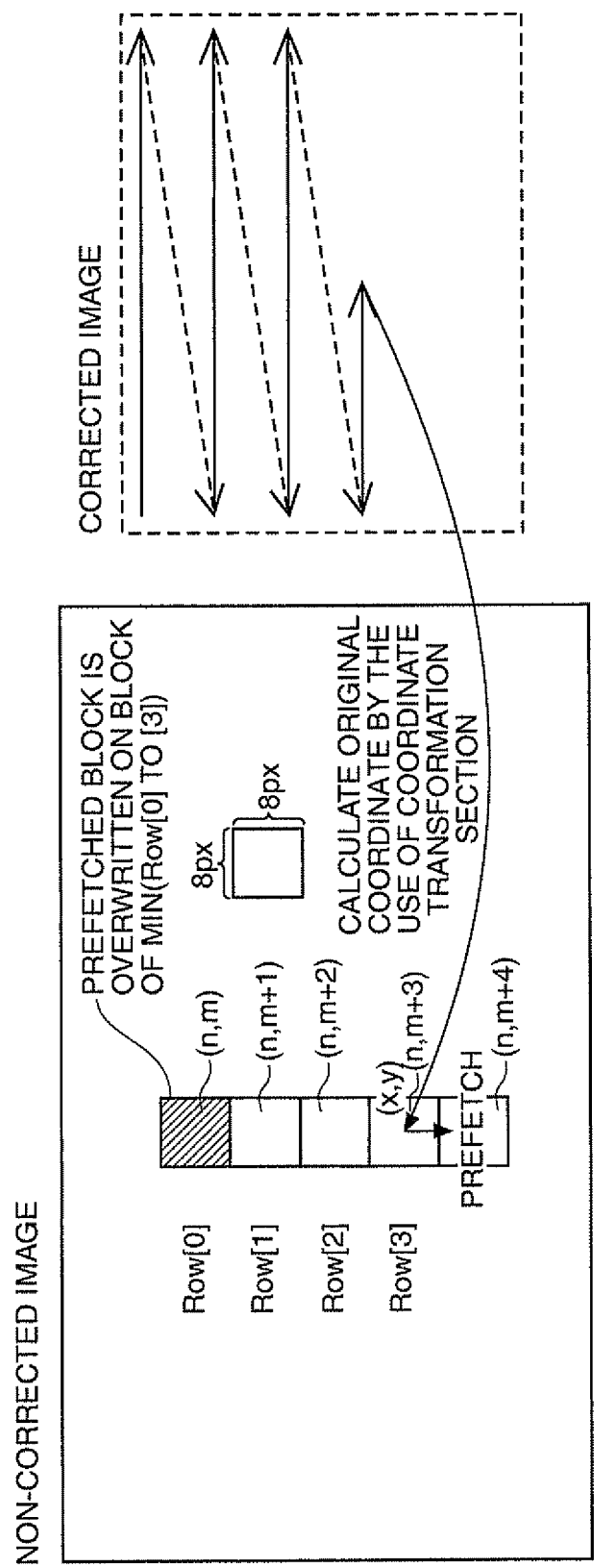
FIG. 11 is a diagram conceptually illustrating prefetch determination in a prefetch request issuing section.

FIG. 11 is a diagram conceptually illustrating the prefetch determination in the prefetch request issuing section 132. In FIG. 11, it is assumed that a cache block (n, m), a cache block (n, m+1), a cache block (n, m+2), and a cache block (n, m+3) of the non-corrected image data are stored in a block area (n, 0), a block area (n, 1), a block area (n, 2), and a block area (n, 3) of the cache block storage section 122.

The condition of the prefetch request is that the integral part Int(x, y) of the non-corrected coordinate input to the prefetch request issuing section 132 enters the cache block having the largest row number out of the cache blocks in the same column stored in the cache block storage section 122. When the prefetch request is issued, the cache block having a row number greater by one than the cache block having the largest row number is read and is overwritten in the area in which the cache block having the smallest row number out of the cache blocks stored in the cache block storage section 122 is stored.

In the example shown in FIG. 11, the integral part Int(x, y) of the non-corrected coordinate input to the prefetch request issuing section 132 enters the cache block (n, m+3). Since the cache block (n, m+3) out of the cache blocks of the n columns stored in the cache block storage section 122 is the cache block having the largest row number, the next cache block (n, m+4) is read (prefetched). The prefetched cache block (n, m+4) is overwritten in the block area (n, 0) in which the cache block (n, m) having the smallest row number out of the cache blocks of the n columns stored in the cache block storage section 122 is stored.

The reason for setting the prefetch request condition as described above is as follows. In a general trapezoidal distortion correction, when there is not rotation and inversion in the coordinate transformation of transforming the corrected coordinate into the non-corrected coordinate, the interpolation block necessary for the pixel interpolation moves from the upper side to the lower side in the non-corrected image as shown in FIGS. 2A and 2B. That is, when the x coordinate is fixed, the interpolation block having a smaller y coordinate moves to the interpolation block having a larger y coordinate. Accordingly, when the integral part of the non-corrected coordinate supplied from the coordinate transformation section 129 to the prefetch request issuing section 132 enters a block having the largest row number out of the cache blocks stored in the cache block storage section 122, there is a possibility that a block which the integral part of the non-corrected coordinate to be supplied from the prefetch request issuing section 132 at the next time enters does not exist. Therefore, in this case, the problem is solved by reading the next cache block and storing the read cache block in the cache block storage section 122.

Here, since only four blocks can be stored in the same column of the cache block storage section 122, the prefetched cache block is stored in the area in which the cache block having the smallest row number, which has the lowest possibility to be used for the next pixel interpolation, is stored.

When the prefetch request condition is satisfied, the prefetch request issuing section 132 issues a prefetch request to the cache block controller 121. The prefetch request includes a coordinate of the cache block to be prefetched in the frame buffer 150, that is, a row number and a column number of the cache block, and a coordinate position of a block area in which the cache block is stored in the cache block storage section 122, that is, a row number and a column number of the block area. The prefetch request issuing section 132 issues the prefetch request and updates the tag information corresponding to the designated block area. Specifically, WRITING=1 is set and Y_ADR is set as the coordinate (row number) of the cache block to be prefetched.

The cache block controller 121 reads the cache block located at the designated coordinate position (column number, row number) from the frame buffer 150 on the basis of the prefetch request and stores the read cache block in the designated block area (column number, row number). When the designated cache block is stored in the cache block storage section 122, the prefetch request issuing section 132 updates the corresponding tag information in the cache-block tag information storage section 123 into VALID=1 and WRITING=0.

Figure 12:
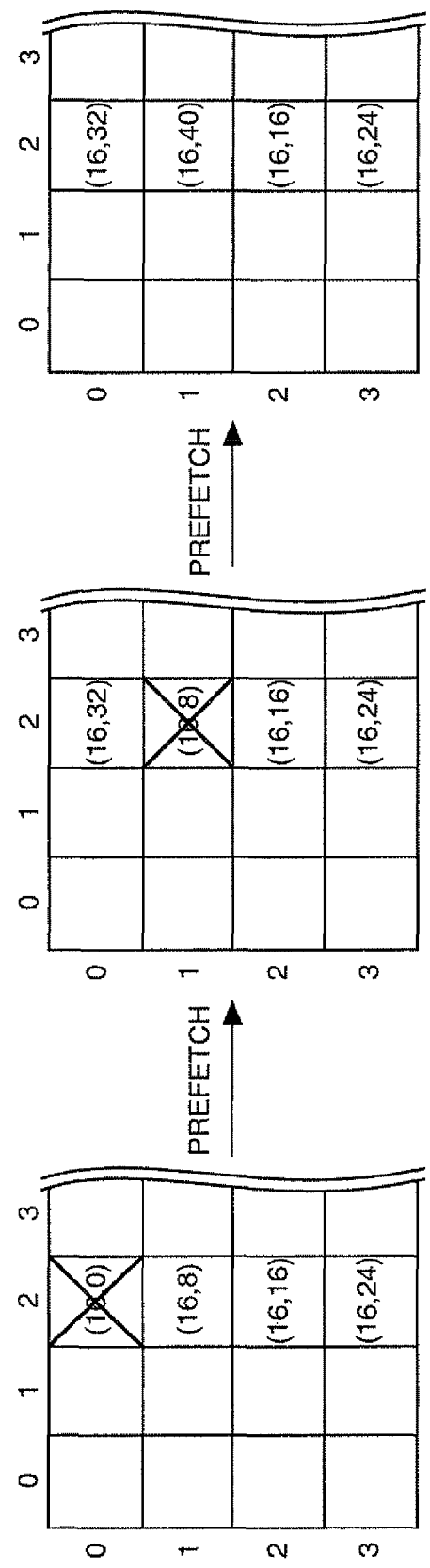
FIGS. 12A to 12C are diagrams illustrating a variation of a cache block stored in the cache block storage section by the prefetch.

FIGS. 12A to 12C are diagrams illustrating a variation of the cache block stored in the cache block storage section 122 by the prefetch. FIGS. 12A to 12C show cache blocks stored in the second column in the cache block storage section 122. In FIGS. 12A to 12C in consideration of the relationship with the integral part Int(x, y) of the non-corrected coordinate input to the prefetch request issuing section 132, the cache block is identified using the coordinate of the upper-left-end pixel in the non-corrected image. For example, the cache block of which the coordinate of the upper-left-end pixel in the non-corrected image is (16, 0) is called cache block (16, 0).

In FIG. 12A, the cache block stored at the time of starting the trapezoidal distortion correcting process is shown. That is, the cache block (16, 0) is stored in the block area (2, 0), the cache block (16, 8) is stored in the block area (2, 1), the cache block (16, 16) is stored in the block area (2, 2), and the cache block (16, 24) is stored in the block area (2, 3). When the integral part Int(x, y) of the non-corrected coordinate input to the prefetch request issuing section 132 enters the cache block (16, 24), that is, when the integral part of the input y coordinate is in the range of 24 to 31, the prefetch request is issued and the cache block (16, 32) is read. The read cache block (16, 32) is overwritten in the block area (2, 0) in which the cache block (16, 0) having the smallest y coordinate out of the cache blocks stored in the second column of the cache block storage section 122 is stored (FIGS. 12A and 12B).

Thereafter, when the integral part Int(x,y) of the non-corrected coordinate input to the prefetch request issuing section 132 enters the cache block (16, 32), that is, when the integral part of the input y coordinate is in the range of 32 to 39, the prefetch request is issued and the cache block (16, 40) is read. The read cache block (16, 40) is overwritten in the block area (2, 1) in which the cache block (16, 8) having the smallest y coordinate out of the cache blocks stored in the second column of the cache block storage section 122 is stored (FIG. 12B and 12C).

Figure 13:
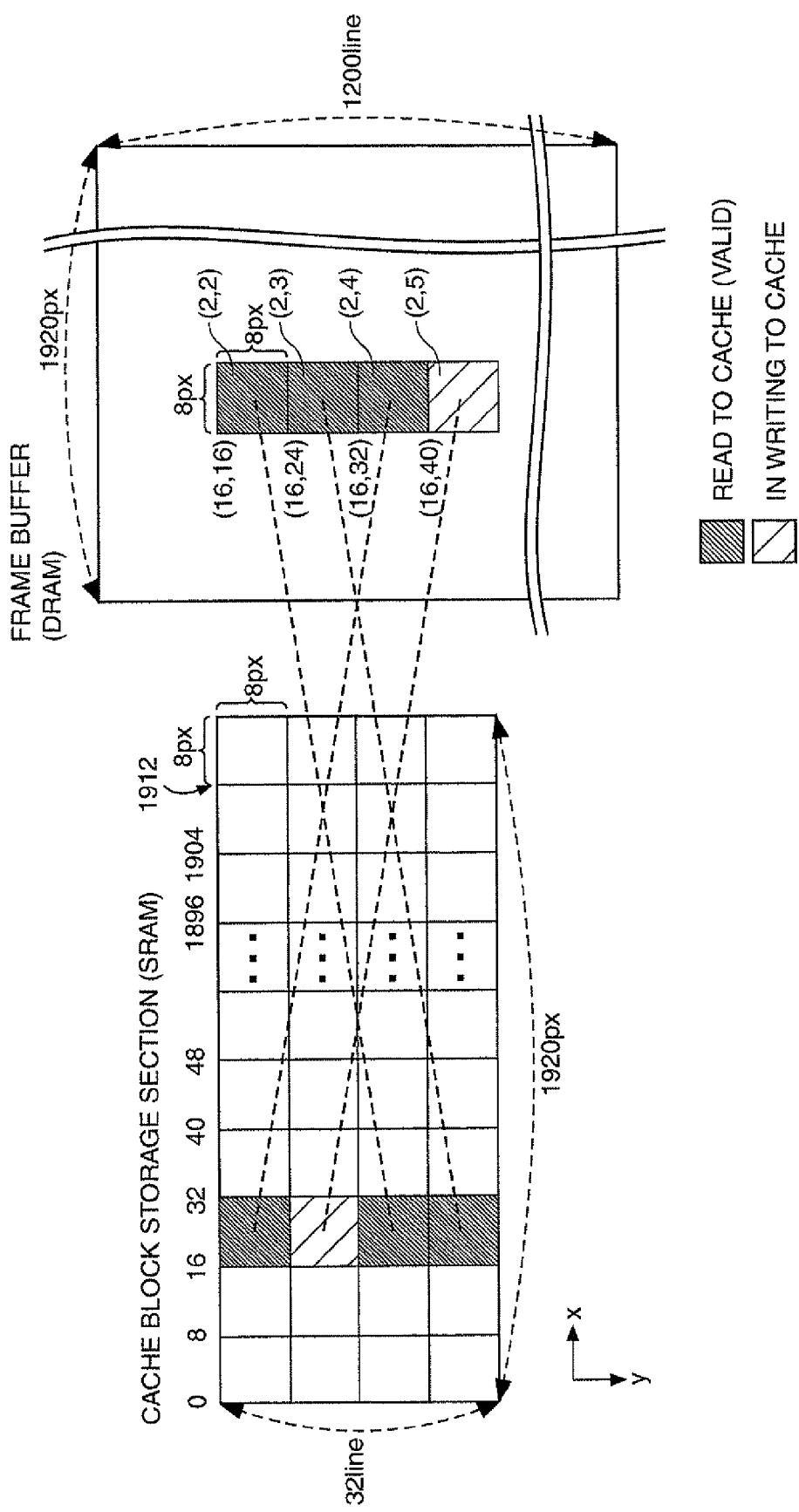
FIG. 13 is a diagram illustrating an example of a cache block stored in the cache block storage section.

FIG. 13 is a diagram illustrating an example of the cache block stored in the cache block storage section 122. In FIG. 13, the relationship between the cache blocks stored in the second column out of the cache blocks stored in the cache block storage section 122 and the coordinates in the frame buffer 150 is shown as an example. In the drawing showing the cache block storage section 122, the numbers described as 0, 8, 16, 32, . . . , 1896, 1904, and 1912 represent the x coordinates of the upper-left-end pixels of the cache blocks stored in the cache block storage section 122 in the non-corrected image, that is, the x coordinates in the frame buffer 150.

FIG. 13 shows the course of moving from FIGS. 12B and 12C. Data of the cache block (16, 32) is stored in the block area (2, 0), data of the cache block (16, 40) is being written to the block area (2, 1), the cache block (16, 16) is stored in the block area (2, 2), and the cache block (16, 24) is stored in the block area (2, 3).

The above-mentioned prefetch determination may be performed for each frame, or the prefetch request is given for the next frame by using (learning) the prefetch determination result for one frame. The relationship between the trapezoidal distortion correction amount (angle and the like) and the prefetch may be simulated and stored in advance and the prefetch may be performed on the basis of the simulation.

A-5. Hit Determination

Figure 14:
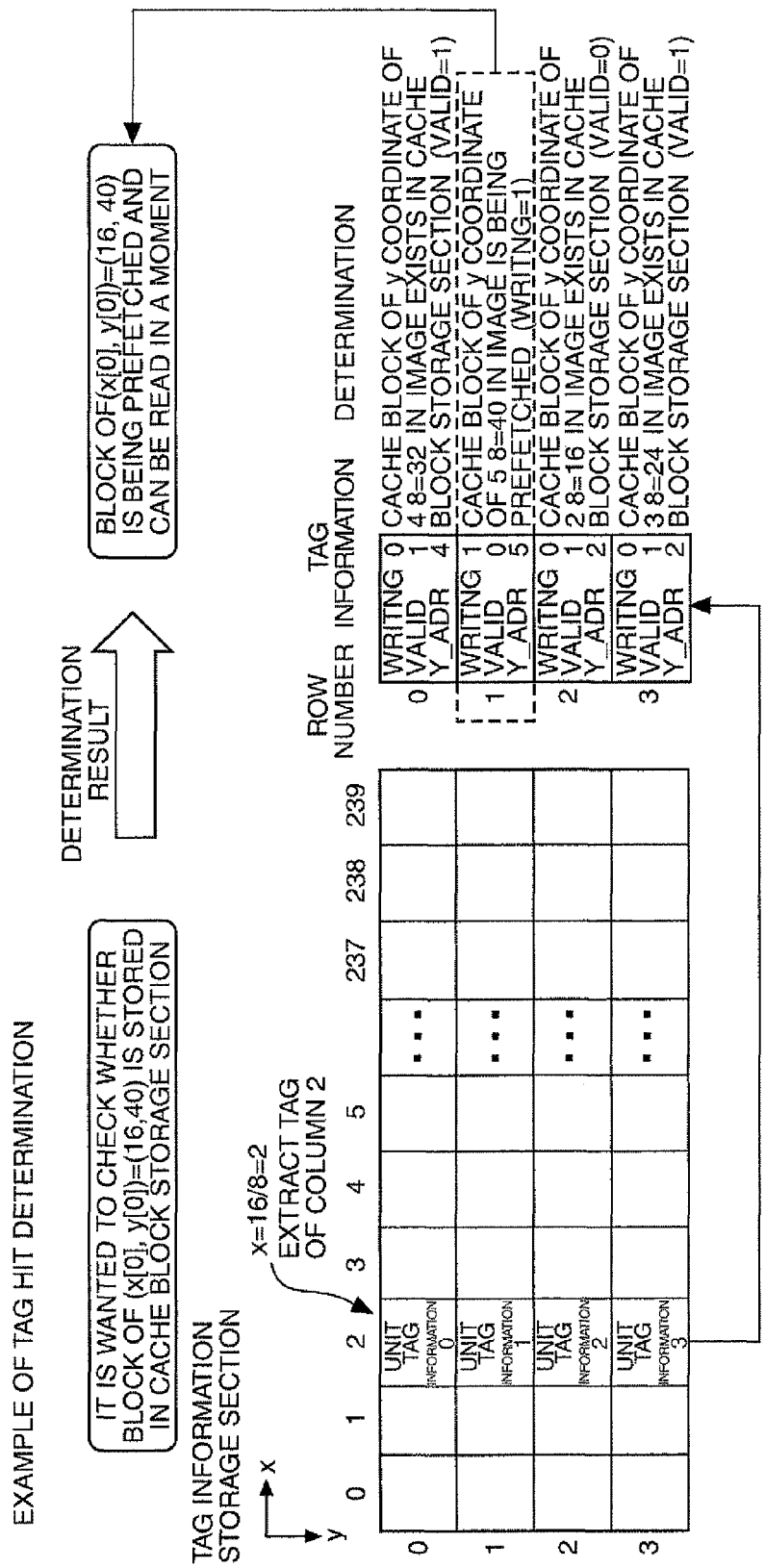
FIG. 14 is a diagram illustrating an example of hit determination using tag information.

FIG. 14 is a diagram illustrating an example of the hit determination using the tag information. In FIG. 14, the tag information corresponding to the cache block stored in the cache block storage section 122 shown in FIG. 13 is shown. That is, the tag information of the block area (2, 0) in the cache block storage section 122 is stored in the second column and the zeroth row of the cache-block tag information storage section 123. When 16 pixels used for the pixel interpolation are (x[0] y[0]), (x[1], y[1]), (x[2] y[2], . . . , and (x[15], y 8 15]), the hit determination is performed sequentially pixel by pixel from (x[0], y[0]). For example, the hit determination when (x[0], y[0])=(16, 40) will be described with reference to FIG. 14.

When it is determined whether the cache block including (x[0], y[0])=(16, 40) is stored in the cache block storage section 122, the hit determination section 131 first extracts a tag of the corresponding column from the cache-block tag information storage section 123. Since one cache block includes 8×8 pixels, the corresponding column can be known by dividing the x coordinate of the pixel used for the pixel interpolation by 8. Since (x[0], y[0])=(16, 40) corresponds to the second column, the tag of the second block is extracted. When the x coordinate is not an integer multiplication of 8, the integral part of the result of dividing the x coordinate by 8 is the column number of the corresponding column.

In FIG. 14, the extracted tag information is described on the right side. The hit determination is performed on the tags from the smallest row number. Hereinafter, the tag information is expressed by TAG[row number]. TAG[0] includes information of WRITING=0, VALID=1, and Y_ADR=4. WRITING=0 states that the prefetch is not being performed and VALID=1 states that data is valid. When Y_ADR=4 is converted into the y coordinate of the non-corrected image, 4×8=32 is obtained. That is, it can be seen from TAG[0] that the block of the y coordinate=32 in the non-corrected image exists in the cache block storage section 122.

TAG[1] includes information of WRITING=1, VALID=0, and Y$_{\_ADR=}$5. WRITING=1 states that the prefetch is being performed and VALID=0 states that data is invalid. When Y_ADR=5 is converted into the y coordinate of the non-corrected image, 5×8=40 is obtained. That is, it can be seen from TAG[1] that the block of the y coordinate=40 in the non-corrected image is being prefetched and can be read in a moment.

TAG[2] includes information of WRITING=0, VALID=1, and Y_ADR=2. WRITING=0 states that the pre fetch is not being performed and VALID=1 states that data is valid. When Y_ADR=2 is converted into the y coordinate of the non-corrected image, 2×8=16 is obtained. That is, it can be seen from TAG[2] that the block of the y coordinate=16 in the non-corrected image exists in the cache block storage section 122.

TAG[3] includes information of WRITING=0, VALID=1, and Y_ADR=3. WRITING=0 states that the prefetch is not being performed and VALID=1 states that data is valid. When Y_ADR=3 is converted into the y coordinate of the non-corrected image, 3×8=24 is obtained. That is, it can be seen from TAG[3] that the block of the y coordinate=24 in the non-corrected image exists in the cache block storage section 122.

That is, as the determination result on whether the cache block including (x[0], y[0])=(16, 40) is stored in the cache block storage section 122, the cache block including (x[0], y[0])=(16, 40) is being prefetched and can be read in a moment.

Figure 15:
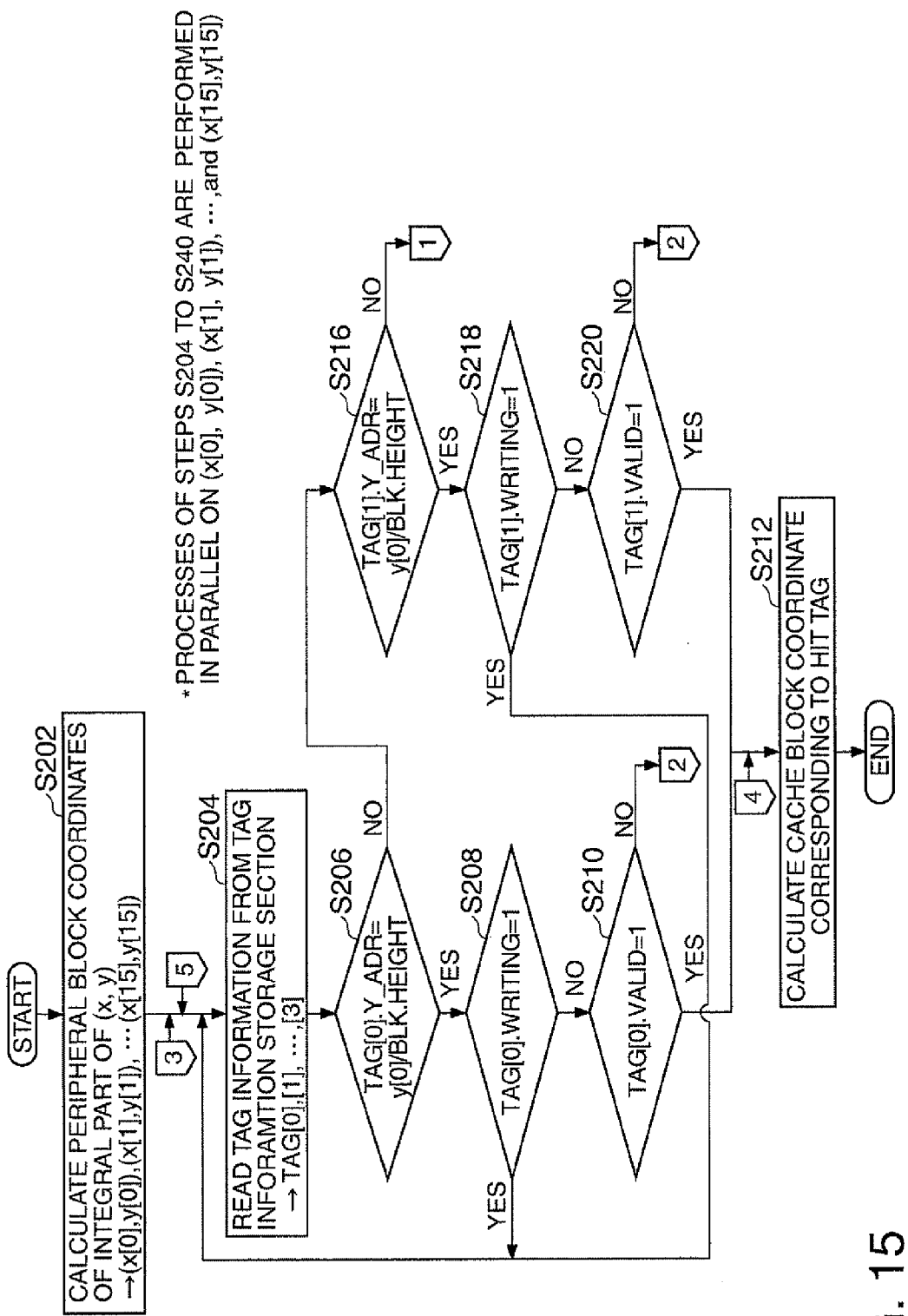
FIG. 15 is a flow diagram schematically illustrating a hit determination process.
Figure 16:
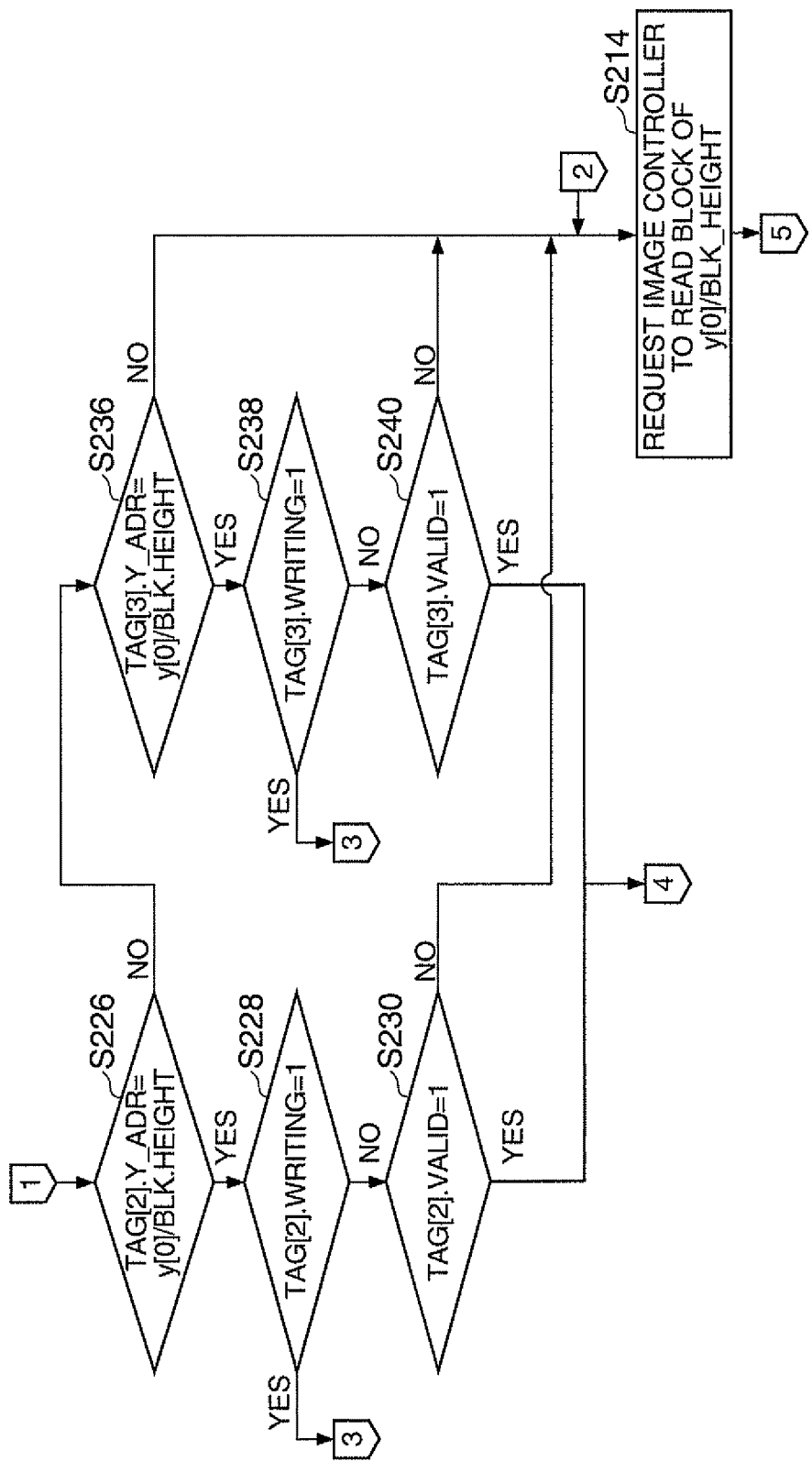
FIG. 16 is a flow diagram schematically illustrating the hit determination process.

FIGS. 15 and 16 are flow diagrams schematically illustrating the flow of the hit determining process in the hit determination section 131 (see FIG. 5). When the integral part Int(x, y) of the non-corrected coordinate is input to the hit determination section 131 from the coordinate transformation section 129, the hit determining process in the hit determination section 131 is started. The hit determination section 131 calculates the coordinates of 16 pixels (x[0], y[0]), (x[1], y[1]), (x[2], y[2]), . . . , and (x[15], y[15]) adjacent thereto on the basis of the integral part Int(x, y) of the non-corrected coordinate input from the coordinate transformation section 129 (step S202). The subsequent processes are performed in parallel on the coordinates (x[0], y[0]), (x[1], y[1]), (x[2], y[2]), . . . , and (x[15], y[15])

When the calculation of the coordinates of the 16 pixels adjacent thereto is ended, the hit determination section 131 reads the tag information (TAG[0] TAG[1], TAG[2], and TAG[3]) from the cache-block tag information storage section 123 (step S204) and determines whether Y_ADR (that is, the row number of the cache block) of TAG[0] is equal to the integral part of (y[0]/height of cache block (8 pixels)) (step S206). When it is determined that they are equal to each other (YES in step S206), the hit determination section 131 determines whether to be WRITING=1 of TAG[0] (step S208). On the other hand, when it is determined that they are not equal to each other (NO in step S206), the process of step S216 is performed.

When WRITING=1 is determined in step S208, the process of step S204 is performed again. When WRITING=0 is determined, the hit determination section 131 determines whether to be VALID=1 of TAG[0] (step S210). When VALID=1 is determined, the hit determination section 131 calculates the coordinate (column number, row number) of the cache block corresponding to the hit tag (step S212). On the other hand, when VALID=0 is determined, the hit determination section 131 outputs a request for reading the cache block (integral part of (x[0]/width of cache block (8 pixels), integral part of y[0]/height of cache block (8 pixels)) to the cache block controller 121 (step S214).

In steps S216, S226, and S236, the same process as step S206 is performed on TAG[1], TAG[2], and TAG[3]. In steps S218, S228, and S238, the same process as step S208 is performed on TAG[1], TAG[2], and TAG[3]. In steps S220, S230, and S240, the same process as step S210 is performed on TAG[1], TAG[2], and TAG[3].

That is, when the row number of the cache block included in the tag information is not equal to the integral part of y[0]/8, the tag information is determined sequentially in the order of the first row, the second row, and the third row from the tag information of the zeroth row in such a way to perform the same process on the next tag information. In steps S208, S218, S228, and S238, since WRITING=1 means that the cache block is being written to the block area corresponding to the tag information, the reading and determining of the tag information are repeated until the writing is ended, that is, until WRITING=0 and VALID=1 are satisfied. When VALID=1 is determined in steps S210, S220, S230, and S240, it means that the cache block including the pixel value of a target coordinate exists in the cache block storage section 122 (it is hit) and thus the coordinate (column, row) of the cache block corresponding to the hit tag is calculated.

A-6. Advantages of Embodiment

As described above, since the projector 100 according to this embodiment includes the prefetch request issuing section 132, the cache block necessary for obtaining the pixel value of the (n+1)-th pixel or the pixels subsequent thereto can be read in advance (prefetched) and can be stored in the cache block storage section 122 at the time of performing the pixel interpolation for obtaining the pixel value of the n-th pixel. Therefore, the necessary cache block need not be stored in the cache block storage section 122 again at the time of obtaining the pixel value of the (n+1)-th pixel or the pixels subsequent thereto. That is, it is possible to reduce the block writing waiting time shown in FIG. 6. Therefore, it is possible to increase the rate of the trapezoidal distortion correcting process.

In this embodiment, the tag information in the cache-block tag information storage section 123 is stored in the same line as the line of, the corresponding block area of all the block areas of the cache block storage section 122. The cache block is stored in the block area of the same column number as the column number of the cache block. Therefore, since the column of the tag information for the coordinate to be subjected to the hit determination is first extracted at the time of performing the hit determination and then the hit determination is sequentially performed on the column, it is possible to simplify the retrieval of the x coordinate and to increase the hit determination rate.

In this embodiment, since a frame buffer (DRAM) having a large capacity and a low rate is used as the primary buffer and a cache memory (SRAM) having a small capacity and a high rate is used as the secondary buffer, it is possible to reduce the cost.

B. Modifications

The invention is not limited to the above-mentioned embodiment, but may be modified in various forms without departing from the concept of the invention.

(1) In the above-mentioned embodiment, the cache blocks of (0, 0) to (239, 3) are read from the frame buffer 150 and are stored in the cache block storage section 122 at the time of starting the trapezoidal distortion correcting process. However, at the time of starting the trapezoidal distortion correcting process, the cache blocks may not be stored in the cache block storage section 122, but the cache blocks may be sequentially stored in the cache block storage section 122 whenever a cache block reading request is input to the cache block controller 121. In this case, the tag information corresponding to the block area not storing the cache block is set to VALID=0.

(2) In the above-mentioned embodiment, the hit determination section 131 is provided, but the hit determination section 131 may not be provided. When the hit determination section 131 is not provided, for example, the prefetch request issuing section 132 may supply the reading position to the interpolation block reading section 124. In this configuration, the cache block including the interpolation block necessary for the pixel interpolation can be read and stored in the cache block storage section 122 by issuing the prefetch request.

(3) The number of pixels in a frame, the number of pixels in a cache block, and the number of pixels in an interpolation block (the number of pixels used for the pixel interpolation) are not limited to the above-mentioned embodiment.

(4) A projection transform processing device including the frame buffer 150 and the trapezoidal distortion correcting unit 120 of the above-mentioned embodiment may be implemented. For example, an image display apparatus may be implemented which displays an image on an image display unit such as a liquid crystal panel or an organic EL (Electro-Luminescence) panel on the basis of image data having been subjected to a transform process by a projection transform processing device. A digital camera may be implemented which includes a projection transform processing device and an image display unit such as a liquid crystal panel. In this case, the projection transform processing device corrects a distortion (perspective distortion) caused when a sensor of a camera is not parallel to an object and outputs the corrected image to the image display unit, whereby the image captured in a state where the sensor of the camera is assumed as being parallel to the object is displayed on the image display unit. The image data having been subjected to the transform process by the projection transform processing device may be output to various output devices, for example, may be output to a printer or may be written to a hard disk. In this case, it is possible to increase the processing rate of the trapezoidal distortion correcting process by providing the prefetch request issuing section 132.

(5) In the above-mentioned embodiment, the projector 100 modulates a beam from the illumination optical system 152 using the transmissive liquid crystal panel unit 192. However, the invention is not limited to the transmissive liquid crystal panel unit 192, but the beam from the illumination optical system 152 may be modulated, for example, by a digital micro-mirror device or a reflective liquid crystal panel. A CRT projector may be employed which projects an image on a small-sized CRT (Cathode Ray Tube) onto a projection plane.

(6) Some functions embodied by software in the above-mentioned embodiment may be embodied by hardware or some functions embodied by hardware may be embodied by software.

(7) In the above-mentioned embodiment, the condition of the prefetch request is that the integral part Int(x, y) of the non-corrected coordinate input to the prefetch request issuing section 132 enters the cache block having the largest row number out of the cache blocks of the same column stored in the cache block storage section 122. However, the condition of the prefetch request is not limited to the above-mentioned embodiment. For example, the condition of the prefetch request may be that one cache block stored in the cache block storage section 122 is used by a predetermined number of times or more.

(8) In the above-mentioned embodiment, the cache block storage section 122 has the same width as the frame width of one frame and the cache block is stored in the block area having the same column number as the column number of the cache block. However, the width of the cache block storage section 122 may not be equal to the frame width of one frame. The cache block may not be stored in the block area having the same column number as the column number of the cache block. In this case, it is also possible to perform the prefetch determination or the hit determination using the tag information by causing the tag information to include both the x coordinate information and the y coordinate information.

What is claimed is:

1. A projector projecting and displaying an image on a projection plane, comprising:
   a frame image storage unit that stores input image data input to the projector;
   a block image storage unit that has a smaller capacity than that of the frame image storage unit and that stores a part of the input image data in terms of block image data including M×N (where M and N≥2) pixels,
     wherein the input image data is divided into the block image data in both a line direction and a pixel direction;
   a correction processing unit, controlled by a processor, that performs a correction process of correcting a distortion of the image projected onto the projection plane to generate corrected image data which is image data after correction on the basis of the block image data stored in the block image storage unit;
   a block image predicting unit, controlled by a processor, that:
     while the correction processing unit performs the correction process on a predetermined pixel, predicts the block image data necessary for the correction process on a pixel to be processed after the predetermined pixel; and
     when the predicted block image data is not stored in the block image storage unit, reads the predicted block image data from the frame image storage unit and stores the predicted block image data in the block image storage unit; and
   a tag information storage unit that stores tag information including coordinate information representing at least one of an x coordinate which is a coordinate in a line direction in the input image data stored in a block area and a y coordinate which is a coordinate in a pixel direction therein as information about the block area storing one piece of the block image data in the block image storage unit,
   wherein the block image predicting unit predicts the block image data on the basis of the tag information stored in the tag information storage unit and a processing direction of the correction process, and
   wherein the tag information stored in the tag information storage unit is stored in a same line as a line of a corresponding block area of the block image storage unit.

2. The projector according to claim 1, wherein the tag information storage unit stores the tag information corresponding to all the block image data stored in the block image storage unit in the order of the x coordinates of the input image data.

3. The projector according to claim 1, further comprising a determination unit, controlled by a processor, that determines whether the block image data used in the correction process on a predetermined pixel is stored in the block image storage unit when the correction processing unit performs the correction process on the predetermined pixel and that reads the block image data from the frame image storage unit and stores the read block image data in the block image storage unit when the block image data is not stored in the block image storage unit.

4. The projector according to claim 3, wherein the determination unit performs the determination using a tag information stored in the tag information storage unit.

5. The projector according to claim 1, wherein the block image predicting unit concurrently predicts the block image data while the correction process is performed on the predetermined pixel.

6. The projector according to claim 1, wherein when the predicted block image data is not stored in the block image storage unit, the block image predicting unit reads the predicted block image data from the frame image storage unit and stores the predicted block image data in the block image storage unit prior to interpolation of the pixel to be processed after the predetermined pixel.

7. A projection transform processing device performing a transform process on input image data input thereto using a transform technique of projection transform, comprising:
  a frame image storage unit that stores the input image data;
  a block image storage unit that has a smaller capacity than that of the frame image storage unit and that stores a part of the input image data in terms of block image data including M×N (where M and N≥2) pixels,
    wherein the input image data is divided into the block image data in both a line direction and a pixel direction;
  a transform processing unit, controlled by a processor, that performs the transform process on the basis of the block image data stored in the block image storage unit and generates transformed image data representing an image after the transform process has been performed thereon;
  a block image predicting unit, controlled by a processor, that:
    while the transform processing unit performs the transform process on a predetermined pixel, predicts the block image data necessary for the transform process on a pixel to be processed after the predetermined pixel; and
    when the predicted block image data is not stored in the block image storage unit, reads the predicted block image data from the frame image storage unit and stores the predicted block image data in the block image storage unit; and
  a tag information storage unit that stores tag information including coordinate information representing at least one of an x coordinate which is a coordinate in a line direction in the input image data stored in a block area and a y coordinate which is a coordinate in a pixel direction therein as information about the block area storing one piece of the block image data in the block image storage unit,
    wherein the block image predicting unit predicts the block image data on the basis of the tag information stored in the tag information storage unit and a processing direction of the correction process, and
    wherein the tag information stored in the tag information storage unit is stored in a same line as a line of a corresponding block area of the block image storage unit.

8. An image processing method in a projector projecting and displaying an image on a projection plane, comprising:
  storing input image data input to the projector in a frame image storage unit;
  storing a part of the input image data in a block image storage unit, which has a smaller capacity than that of the frame image storage unit, in terms of block image data including M×N (where M and N≤2) pixels,
    wherein the input image data is divided into the block image data in both a line direction and a pixel direction;
  performing a correction process of correcting a distortion of the image projected onto the projection plane to generate corrected image data which is image data after the correction process has been performed on the basis of the block image data stored in the block image storage unit;
  while the correction process is performed on a predetermined pixel, predicting the block image data necessary for the correction process on a pixel to be processed after the predetermined pixel;
  when the predicted block image data is not stored in the block image storage unit, reading the predicted block image data from the frame image storage unit and storing the predicted block image data in the block image storage unit;
  storing tag information including coordinate information representing at least one of an x coordinate which is a coordinate in a line direction in the input image data stored in a block area and a y coordinate which is a coordinate in a pixel direction therein as information about the block area storing one piece of the block image data,
  predicting the block image data on the basis of the stored tag information and a processing direction of the correction process, and
  wherein the stored tag information is stored in a tag information storage unit at a same line as a line of a corresponding block area of the block image storage unit.

* * * * *